United States Patent
Miyazaki

(10) Patent No.: US 9,634,879 B2
(45) Date of Patent: Apr. 25, 2017

(54) DEMODULATOR APPARATUS AND DEMODULATION METHOD

(71) Applicant: FUJITSU LIMITED, Kawasaki-shi, Kanagawa (JP)

(72) Inventor: Shunji Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/003,338

(22) Filed: Jan. 21, 2016

(65) Prior Publication Data

US 2016/0254939 A1 Sep. 1, 2016

(30) Foreign Application Priority Data

Feb. 26, 2015 (JP) ................................. 2015-037445

(51) Int. Cl.
*H04B 1/66* (2006.01)
*H04L 27/38* (2006.01)
*H04L 27/34* (2006.01)

(52) U.S. Cl.
CPC ...... *H04L 27/3818* (2013.01); *H04L 27/3416* (2013.01)

(58) Field of Classification Search
CPC ..... H04L 25/067; H04L 27/2647; H04L 1/00; H04L 1/005; H04L 1/0054; H04L 25/03292; H04L 1/0045; H04L 25/03171; H04B 7/0854; H04B 7/0413; H04B 7/085
See application file for complete search history.

(56) References Cited

U.S. PATENT DOCUMENTS

| 9,014,253 B2 * | 4/2015 | Siti | H04L 1/0052 |
| | | | 375/233 |
| 2008/0043864 A1 | 2/2008 | Fujii | |
| 2009/0060078 A1 * | 3/2009 | van Zelst | H04L 1/06 |
| | | | 375/262 |
| 2014/0192936 A1 * | 7/2014 | Fukawa | H04B 7/0854 |
| | | | 375/341 |

FOREIGN PATENT DOCUMENTS

JP 2008-048219 2/2008

OTHER PUBLICATIONS

D. Wubben, et al., "Near-Maximum-Likelihood Detection of MIMO Systems Using MMSE-Based Lattice-Reduction"IEEE Communications Society, Int. Conf. on Commun. (ICC'04), vol. 2, pp. 798-802, Jun. 2004 (5 pages).

(Continued)

*Primary Examiner* — Khanh C Tran
(74) *Attorney, Agent, or Firm* — Fujitsu Patent Center

(57) ABSTRACT

A demodulator apparatus includes a memory and a processor coupled to the memory. The processor executes a process including: applying lattice reduction to a channel response matrix; applying linear detection to a reception signal in lattice-reduced basis using a lattice-reduced channel response matrix; calculating an expectation of a symbol in the lattice-reduced basis; inversely transforming the expectation of the symbol from the lattice-reduced basis into an original basis; and calculating soft-decision data by performing interference cancellation method in inversely transformed expectation of the symbol in the original basis.

10 Claims, 12 Drawing Sheets

(56) References Cited

OTHER PUBLICATIONS

X-F. Qi, et al., "A Lattice-Reduction-Aided Soft Demapper for High-Rate Coded MIMO-OFDM Systems", IEEE Signal Processing Letters, vol. 14, No. 5, pp. 305-308, May 2007 (4 pages).
S. Aubert, et al.; "Lattice Reduction-Aided Minimum Mean Square Error K-Best Detection for MIMO Systems", International Conference on Computing, Networking and Communications, Wireless Communications Symposium, pp. 1066-1070, ICNC 2012 (5 pages).
H. Yao, et al.; "Lattice-Reduction-Aided Detectors for MIMO Communication Systems", in IEEE Proc. Globecom, Taipei, Taiwan, pp. 424-428, Nov. 17-21, 2002 (5 pages).

* cited by examiner

LATTICE REPRESENTATION IN ORIGINAL LATTICE BASIS

LATTICE REPRESENTATION IN LATTICE-REDUCED BASIS

DEMODULATOR APPARATUS AND DEMODULATION METHOD

CROSS-REFERENCE TO RELATED APPLICATION

This application is based upon and claims the benefit of priority of the prior Japanese Patent Application No. 2015-037445, filed on Feb. 26, 2015, the entire contents of which are incorporated herein by reference.

FIELD

The embodiments discussed herein are related to a demodulator apparatus and a demodulation method.

BACKGROUND

Wireless communication systems using multiple-input multiple-output (MIMO) multiplexing are known. According to MIMO, a transmission signal transmitted by a transmitter device contains a result of multiplexing a plurality of independent symbols. The receiver device receives the transmitted signal via a plurality of reception antennas, demodulates the reception signal, and outputs soft-decision data corresponding to the transmitted bits. In the MIMO demodulation, the receiver device performs the process of estimating the optimal symbols from the reception signal.

Exemplary known approaches for estimating the optimal symbol from a reception signal include full-maximum likelihood detection (MLD), which searches for the nearest lattice point comprehensively for every symbol, and, maximum mean square estimation (MMSE). Another known approach for reducing the computational load of the Full-MLD is complexity reduced MLD with QR decomposition and M-algorithm (QRM-MLD).

It is known that, the probability at which a symbol nearer to the optimal symbol is detected can be improved by applying linear detection such as MMSE under a lattice-reduced basis that is resultant of lattice reduction transformation, compared with when linear detection is applied under the original basis. Furthermore, it is known that reception characteristics such as an error ratio are improved under certain conditions by applying QRM-MLD under the lattice-reduced basis that is resultant of the lattice reduction transformation.

Prior art examples are disclosed in D. Wubben, R. Bohnke, V. Kuhn, and K. D. Kammeyer, "Near-maximum-likelihood detection of MIMO systems using MMSE-based lattice reduction," IEEE Int. Conf. on Commun. (ICC '04), Vol. 2, June, 2004; X.-F. Qi and K. Holt, "A Lattice-Reduction-Aided Soft Demapper for High-Rate Coded MIMO-OFDM Systems" IEEE Signal Processing Letters, vol. 14, no. 5, pp. 305-308, May 2007; and S. Aubert, Y. Nasser, and F. Nouvel, "Lattice Reduction-Aided Minimum Mean Square Error K-Best Detection for MIMO Systems" in International Conference on Computing, Networking and Communications, ICNC 2012.

A transmitter device appends an error-correcting code and the like, and transmits the resultant information bit sequence, as an encoded bit sequence. The receiver device then demodulates the received signal sequence, generates soft-decision data, and performs processing such as error correction based on the generated soft-decision data, and estimates the transmitted information bit sequence. While QRM-MLD is capable of reducing the computational load by applying the lattice reduction, the computational load is still quite heavy, compared with linear detection such as MMSE.

In addition, linear detection using the lattice reduction outputs hard-decision data as the demodulation result. Linear detection using the lattice reduction is capable of achieving an error-correction performance equivalent to that of QRM-MLD with the lattice reduction, but with less computational load than that in QRM-MLD using the lattice reduction. Considering subsequent processes including error correction using the soft-decision data, linear detection using the lattice reduction, however, exhibits inferior reception performance, compared with QRM-MLD using the lattice reduction.

SUMMARY

According to an aspect of an embodiment, a demodulator apparatus includes a memory and a processor coupled to the memory. The processor executes a process including: applying lattice reduction to a channel response matrix; applying linear detection to a reception signal in lattice-reduced basis using a lattice-reduced channel response matrix; calculating an expectation of a symbol in the lattice-reduced basis; inversely transforming the expectation of the symbol from the lattice-reduced basis into an original basis; and calculating soft-decision data by performing interference cancellation method in inversely transformed expectation of the symbol in the original basis.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments described below are not intended to limit the scope of the technology according to the embodiment in any way. The embodiments may be combined as appropriate, within the scope in which processes do not contradict each other.

Overview of Communication System 10

Figure 1:
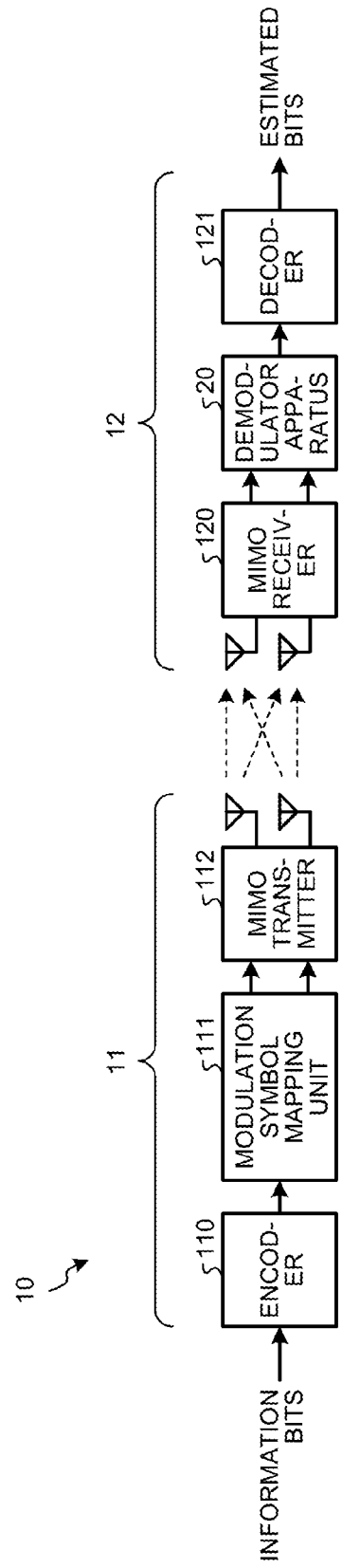
FIG. 1 is a schematic of an exemplary communication system.

FIG. 1 is a schematic of an exemplary communication system 10. In the communication system 10, a transmitter device 11 and a receiver device 12 exchange information bits over a wireless channel. A process performed by each of these devices will now be explained briefly.

Process Performed by Transmitter Device 11

The transmitter device 11 includes an encoder 110, a modulation symbol mapping unit 111, and a MIMO transmitter 112. The encoder 110 converts an input information bit sequence into an encoded bit sequence by error-correction-encoding the information bit sequence. The modulation symbol mapping unit 111 maps the encoded bit sequence to signal symbols by modulating the bit sequence in units of a specified number of bits. A signal symbol (hereinafter, referred to as a "symbol") is represented as a different point mapped to a value of the original bit in a complex plane (signal space).

The MIMO transmitter 112 divides a signal symbol sequence into a plurality of independent sequences (layers). The MIMO transmitter 112 simply maps the symbol in each of the layers, or maps the result of multiplexing symbols in a plurality of layers to any one of a plurality of antennas, before transmitting the symbols as a signal sequence. The data signal sequence mapped to an antenna is referred to as a stream. Each of the streams is converted into the form of the corresponding carrier, and transmitted to the channels simultaneously via a plurality of antennas at each unit time. The transmission signals transmitted per unit time are transmitted with a plurality of independent symbols multiplexed. In this sense, these channels are referred to as "space-multiplexed channels".

Process Performed by Receiver Device 12

The receiver device 12 includes a MIMO receiver 120, a demodulator apparatus 20, and a decoder 121. The MIMO receiver 120 receives data via a plurality of reception antennas. The transmission symbols included in the data received from the reception antennas are multiplexed symbols transmitted via a plurality of transmission antennas.

The demodulator apparatus 20 acquires likelihood data serving as soft-decision data corresponding to each bit from the received symbol. The likelihood data is also referred to as soft-decision data, from the viewpoint of decoding. The decoder 121 performs an error correcting decoding process using soft-decision data, and estimates the transmitted bits. The decoder 121 then outputs the estimated bits as the estimation bits.

In the description herein, because the present embodiment is not affected by the details of layer mapping and precoding, the details will be omitted. These processes are generally represented as transformation matrixes applied to a stream, and are multiplications performed prior to and subsequent to a channel response matrix. Therefore, by re-defining the channel response matrix along with these matrixes, following formulization can be used. The term "layer" and "transmission antenna" are used as almost synonyms, hereunder, as appropriate.

Premise

Before explaining the embodiment, the items presumed in the embodiments will now be explained. Definitions of terms are provided below in Table 1.

TABLE 1

| Symbol | Definition |
|---|---|
| N | Number of Transmission Antennas |
| M | Number of Reception Antennas |
| K | Information Bit Size |
| $N_c$ | Code Bit Size |
| $R_c = K/N_c$ | Coding Rate |
| m-QAM | Modulation Mapping |
| $m_c$ | Mapping Bit Count |
| $M_c$ | Number of Signal Points (Constellation) ($M_c = 2^{m_c} = $ 4, 16, 64, 256) |
| $C_{m_c}$ | Signal Point (Constellation) ($C_{m_c} = [c_1, c_2, \ldots, c_{M_c}]$) |
| $E_s$ | Total Transmission Power |
| $E_{s,N}$ | Transmission Power Per Antenna ($E_{s,N} = E_s/N$) |
| $a_i$ | Information Bit Sequence (i = 1, 2, ..., K $a_i \in \{0, 1\}$) |
| $b_i$ | Code Bit Sequence (i = 1, 2, ..., $N_c$ $b_i \in \{0, 1\}$) |
| $b_i \in \{0, 1\}$ | Amplitude Symbol Representation |
| $\bar{b}_i \in \{+1, -1\}$ | Amplitude Symbol Representation |
| $s_j \in C_{m_c}$ | Transmission Symbol ($m_c$ = 2, 4, 6, 8 j = 1, 2, ... N) |
| s | Transmission Symbol Vector |
| $\hat{s}_j$ | Estimated Symbol (Without Noise) |
| $\tilde{s}_j$ | Estimated Symbol (Including Noise) |
| $b_k$ | Symbol Mapping Block (k = 1, 2, ..., $m_c$ $b_k \in \{0, 1\}$) |
| $y_i$ | Reception Data (i = 1, 2, ..., M i: Reception Antenna Index) |
| y | Transmission Data Vector |
| $n_i$ | Noise Signal (Dispersion: $E[|n_i|^2] = 2\sigma^2 = N_0$) |
| n | Noise Vector |
| $h_{ij}$ | Channel Response Matrix (i = 1, 2, ..., M; j = 1, 2, ..., N) |
| $H = [h_{ij}]$ | Matrix Representation |
| $H = [h_1 h_2 \ldots h_N]$ | Row Vector Representation |
| $L_k$ | Soft-decision Data (in Unit of Symbol) (k = 1, 2, ..., $m_c$) |

In Table 1, it is assumed herein that, as a prior condition, modulation mapping m-QAM is quadrature amplitude modulation (QAM) defined in a part of a tetragonal lattice space plotted two-dimensionally. In the signal points (constellation), $c_i$ is represented as a complex number. The real-number component and the imaginary-number component of $c_i$ are referred to as an I channel component and a Q channel component, respectively. A symbol mapping block $b_k$ is a small block of an encoded bit sequence, divided from the head of the sequence in units of $m_c$.

It is also assumed herein that the statistical properties of the channel response matrix are represented herein by a fading environment model that is generally used. It is also particularly assumed that, in the symbol resource space of time frequencies, the amplitude varies by a very small degree within one block that is a group of symbols, and the amplitudes can be approximated as being constant within the block. The soft-decision data $L_k$ is a quantity of a real value corresponding to a log-likelihood ratio or a metric, and has a positive or negative sign and a size. The positive or negative value corresponds to a hard-decision bit. In the explanation hereunder, Hermitian transpose of a complex matrix X is represented as $X^\dagger$ or $X^H$, as appropriate.

In this embodiment, the system model is expressed as Equation (1) below, for example.

$$y = \sqrt{E_{s,N}} Hs + n \quad (1)$$

Modulation Scheme

Mapping a block containing a plurality of bits to a signal point represented as a complex number is generally referred to as multi-level modulation. In the description herein, the modulation scheme is limited to m-QAM. According to QAM, the I channel component and the Q channel component are independent of each other, and follow the same mapping rule. Therefore, only the I channel will now be explained as a representative example.

Although there are some mapping types depending on the patterns of mapping, assumed herein is typical Gray mapping. With Gray mapping, bit patterns with only one different bit (may be regarded as having only one bit reversed) are assigned to signal points that are adjacent to each other.

Standardizing the average power of symbols to one, the I(Q) component in the QAM is expressed as follows.

$$s = A \times m \quad m = -(M_{c2}-1), -(M_{c2}-3), \ldots -3, -1, 1, 3, \ldots (M_{c2}-3), (M_{c2}-1)$$

where $$A = \frac{1}{\sqrt{a_{m_2}}}$$

$$a_{m_2} = \frac{2}{3}(2^{2m_2} - 1) = 2, 10, 42, 85, \ldots \quad m_2 = 1, 2, 3, 4, \ldots$$

$$M_{c2} = 2^{m_2}$$

$m_2$ and $M_{c2} = \sqrt{M_c}$ are the number of bits mapped to the I(Q) component, and the number of different signal points. "A" denotes the lowest amplitude. In other words, the amplitude of the symbols will be "A" multiplied by a positive or negative odd number.

Real Number Expression

A modulation symbol in the base band is usually expressed by a complex number. A channel response, a reception signal, and a noise signal are also expressed by a complex number, accordingly. In the explanation hereunder, however, because geometric and intuitive expressions are convenient, real-number expressions equivalent to complex number expressions will be used in the description below. Matrix and vector operations with complex numbers can be expressed as a matrix and a vector with real-number elements, but twice the size.

For example, multiplication of the scalar values of complex numbers can be expressed by the following mapping relation, as an operation giving a mathematically equivalent result.

[Definitions]
1) Composite number: $a = a_r + j a_i$ $a_r$, $a_i$ are real numbers
[Representations]
Following provide three different, but equivalent representations. A combination of 1 and 2 results in 3.
1) Vector Type I $$b \Leftrightarrow b = \begin{bmatrix} b_r \\ b_i \end{bmatrix}$$

2) Vector Type II $$b \Leftrightarrow b' = \begin{bmatrix} -b_i \\ b_r \end{bmatrix}$$

3) Matrix Type $$a \Leftrightarrow A = \begin{bmatrix} a_r & -a_i \\ a_i & a_r \end{bmatrix}$$

[Multiplication Between Scalar Values]

1) Matrix-Vector Type I $$c = a \cdot b \Leftrightarrow c = Ab$$

$$A = \begin{bmatrix} a_r & -a_i \\ a_i & a_r \end{bmatrix}$$

$$b = \begin{bmatrix} b_r \\ b_i \end{bmatrix}$$

$$c = \begin{bmatrix} c_r \\ c_i \end{bmatrix}$$

♦ Verification $$c = a \cdot b$$

$$Ab = \begin{bmatrix} a_r & -a_i \\ a_i & a_r \end{bmatrix} \begin{bmatrix} b_r \\ b_i \end{bmatrix} = \begin{bmatrix} a_r b_r - a_i b_i \\ a_i b_r + a_r b_i \end{bmatrix} = c$$

2) Matrix—Vector Type II $$c = a \cdot b \Leftrightarrow c' = Ab'$$

$$b' = \begin{bmatrix} -b_i \\ b_r \end{bmatrix}$$

$$c' = \begin{bmatrix} -c_i \\ c_r \end{bmatrix}$$

♦ Verification $$Ab' = \begin{bmatrix} a_r & -a_i \\ a_i & a_r \end{bmatrix} \begin{bmatrix} -b_i \\ b_r \end{bmatrix} = \begin{bmatrix} -a_i b_r - a_r b_i \\ a_r b_r + a_i b_i \end{bmatrix} = c'$$

3) Matrix Type $$c = a \cdot b \Leftrightarrow C = AB$$

$$B = [\, b \;\; b' \,] = \begin{bmatrix} b_r & -b_i \\ b_i & b_r \end{bmatrix}$$

$$c = [\, c \;\; c' \,] = \begin{bmatrix} c_r & -c_i \\ c_i & c_r \end{bmatrix}$$

Extension to a complex vector or matrix can be achieved by replacing the elements to a format extending the degree of freedom, as they are. Through this transformation, the system model expressed in Equation (1) is transformed into a matrix expression with real-number elements. A matrix or a vector is expressed using one of the complex-number elements and real-number elements, unless both of these expressions need to be handled simultaneously, and no definition for identifying each is introduced herein. In the real-number expression, however, the size of a vector or a matrix will be exactly twice of that in the complex-number expression. Herein it is explained that the number of antennas in the real-number expression is twice of that in the complex-number expression unless such an expression causes confusion. In other words, an ordinary 2×2 MIMO system is equivalent to a MIMO system with 4×4 real-number elements.

MIMO Demodulation

Reception data is assumed to be modeled in the form of Equation (1). It is assumed herein, as a prior condition, that reception data y, a channel response matrix H, and transmission power $E_{s,N}$ at each antenna on the receiver end can be acquired through a measurement process performed by the MIMO receiver 120. MIMO demodulation is a process of generating soft-decision data $L_i$ corresponding to a signed bit $b_i$ that is mapped to a transmission symbol.

The soft-decision data mathematically corresponds to a log-likelihood ratio. A log-likelihood ratio is defined as a logarithm of the ratio of a probability at which a transmitted bit is zero and a probability at which the same transmitted bit is one. A probability of a signed bit $b_i$ in a transmission symbol vector s being b=0 or 1 is obtained approximately as a probability at which the symbol vector with the highest probability, among the symbol vector candidates having a value signed bit value $b_i$=b, is the transmission symbol vector.

In this embodiment, a symbol (vector) with the highest probability is referred to as an "optimal symbol (vector)". Hereinafter, a symbol vector is simply referred to as a symbol, unless such an expression causes confusion. When the value of a symbol having the highest probability is reversed with respect to the value b=0 or 1 of each bit in the optimal symbol, this symbol is referred to as an "opposing symbol". The likelihood of each of the bits is given as a logarithm of this probability ratio.

The general steps are as follows:
1) estimating the optimal symbol;
2) estimating the opposing symbol; and
3) generating Soft-Decision Data.

Distinguishing Soft-Decision and Hard-Decision

Generally speaking, when we talk about "MIMO demodulation", we distinguish if the output result is "soft-decision data" or "hard-decision data". In a wireless communication system using MIMO, a data channel with a high transmission rate generally follows the system model illustrated in FIG. 1. In other words, error-correcting encoding is performed before the modulation symbol mapping, and an error correcting decoding process is performed on the receiver side. In this manner, a more reliable receiving process can be implemented in bad wireless propagation environments. To implement a highly reliable and robust decoding process, "soft-decision data" corresponding to each bit is used as input data. The definition of the soft-decision data and hard-decision data used herein will now be explained.

1) Soft-Decision Data

Soft-decision data is data including an estimation of a bit and the reliability of the estimation.

2) Hard-Decision Data (Bit)

In the description herein, hard-decision data represents the bit estimation in the soft-decision data. A symbol including bits represented as hard-decision bits, in the unit of a modulation mapping symbol (or vector), is referred to as a "hard-decision symbol". When a hard-decision symbol is acquired as a result of an optimal demodulation process, the hard-decision symbol is referred to as the "optimal symbol".

Demodulation schemes generally used are classified into following two categories.

(1) Maximum Likelihood Detection (MLD)

MLD exhibits good properties, but imposes a high computational load.

An exemplary scheme for reducing the computational load is a scheme using partial selection.

Specific known examples are sphere decoding (SD) and QRM-MLD.

(2) Linear Detection

Linear detection exhibits inferior properties than MLD, but imposes less computational load.

As an exemplary scheme with improved properties is a scheme with interference cancellation.

Specific example includes successive interference cancellation (SIC) and parallel interference cancellation (PIC).

SIC is a scheme that sequentially iterates a process of estimating the symbol, and a process of canceling an interference component acquired from the estimated symbol from the reception data, in the order at which the symbols are processed.

PIC is a scheme canceling symbols other than the target symbol, using tentative symbol estimation at this point in time. With the interference cancellation method, the computational load is large compared with the conventional linear detection, but the computational load is small compared with MLD and the other approaches for reducing the computational load of MLD.

Lattice Reduction

With MIMO, modulation symbols that are to be transmitted from a plurality of transmission antennas are multiplexed before transmission. A multiplexed signal can be considered as a large symbol. A candidate point of such a symbol can be interpreted as a point in a discrete lattice. A "lattice" is a linear space plotted by basis vectors. In terms of mathematics, the receiving process can be formulated as a method for identifying a point in the lattice among those representing reception signals in the space plotted by the lattice. Within this framework, by transforming the basis vectors that define the lattice appropriately, the properties resultant of the linear detection can be improved.

Lattice reduction is developed to achieve "properties nearer to the properties achieved by MLD, using the linear detection technology", toward the end of acquiring the "optimal symbol" (for example, see H. Yao and G. Wornell, "Lattice-Reduction-Aided Detectors for MIMO Communication Systems", in IEEE Proc. Globecom, Taipei, Taiwan, Nov. 17-21, 2002).

Therefore, from the standpoint of MLD, lattice reduction can be considered as an approach for acquiring properties that are equivalent to the property achieved by MLD, while reducing the computational load of MLD. By contrast, from the viewpoint of linear detection, lattice reduction can be considered as an approach for achieving hard-decision results with better properties than those achieved with conventional linear detection, but with a computational load equivalent to that of the conventional linear detection. Therefore, application of lattice reduction to a conventional demodulation scheme can be considered as filling the gap between the properties and the computational load, in the trade-off relation between the two representative schemes that are MLD and linear detection.

D. Wubben et al., demonstrated that is correct for "hard-decision". For "soft-decision", however, there is a problem. There is no known way to acquire soft-decision data with linear detection in the lattice-reduced basis. By contrast, MLD is capable of acquiring soft-decision data in the lattice-reduced basis. For example, in QRM-MLD that is a conventional approximating MLD-based approach, by using lattice reduction transformation and by performing QRM-MLD in the basis applied with transformation, property deterioration can be suppressed even with a reduced number of candidates. In this manner, the computational load of the MLD can be reduced.

Adoption of this approach is only effective, however, in limited environments. For example, when the fading environment is static, or "quasi-static", which means that variations in the channels are sufficiently low, the effect described above can be achieved. Such environments are, however, not a special environment, but are rather typical environments that are found when the transmission rate is high.

Details of Lattice Reduction

In the description below, real-number expressions will be used. A reception signal can be expressed as, when there is no additional noise component, as follows.

$$y = Hs = h_1 s_1 + h_2 s_2 + \ldots + h_N s_N \quad (2)$$

To keep the expression simple, the transmission power is standardized to one (it may be understood that the transmission power will be redefined by including the power as a scale coefficient to the channel or a symbol). As long as the column vectors $h_i$ are linearly independent from one another, the equation above is established as a definitional mathematical equation in a linear space. Assuming the transmission symbol $s_i$ takes only an integer, in particular, possible values of the reception signal vector y resultant of this operation can be represented as a lattice point having $h_i$ as basis vectors. In general environments where there is some noise, the measurement of the reception signal will be plotted at a position offset from the lattice point, being offset by a noise vector. Based on this understanding, the MIMO demodulation process can be generalized as a process of "identifying a point defined as a transmission symbol in the lattice from a reception signal".

The mathematical expression of a specific given lattice is not limited to Equation (2) described above. A vector defined as a sum of basis vectors corresponds to a lattice point, and therefore, even when linearly independent N points are selected freely, the N points can serve as a basis. Denoting this transformation matrix as T, the same lattice can be expressed as following Equation (3).

$$y = HTT^{-1}s = \tilde{H}z = \tilde{h}_1 z_1 + \tilde{h}_2 z_2 + \ldots + \tilde{h}_N z_N \quad (3)$$

where $$\tilde{H} = HT \quad (4)$$

$$z = T^{-1}s \quad (5)$$

This is referred to as "lattice reduction transformation".

Figure 2:
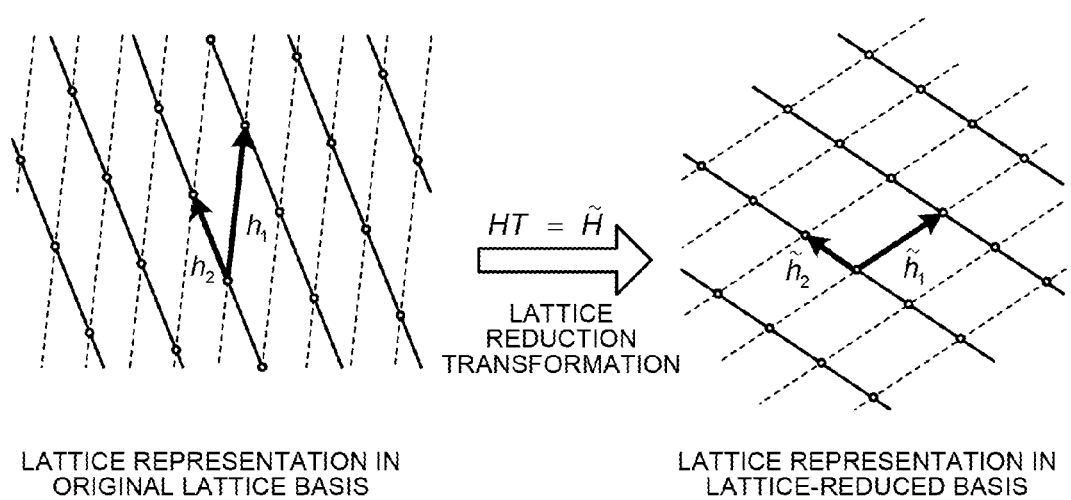
FIG. 2 is a schematic illustrating overview of an exemplary lattice reduction transformation.

Lattice reduction transformation is transformation bringing the basis vectors closer to a relation in which the vectors are perpendicular to each other as much as possible. FIG. 2 is a schematic illustrating an overview of an exemplary lattice reduction transformation. In FIG. 2, the white circles represent lattice points. The points correspond to the possible values of the reception signal, when a transmitted modulation symbol is received at the receiver with no noise component. The left diagram in FIG. 2 is a representation of an original lattice basis that is defined by a channel definition, and illustrates a highly correlated example. The right diagram illustrated in FIG. 2 is resultant of selecting another basis vector pair that is closer to a relation in which the vectors are perpendicular to each other, by applying the lattice basis transformation to the lattice illustrated on the left diagram.

In the lattice reduction transformation, a basis transformation matrix and the inverse matrix of the basis transformation matrix are calculated. Because specific algorithms for calculating the basis transformation matrix and its inverse matrix do not have any impact on the technology according to the embodiment, it is assumed herein that the basis transformation matrix and its inverse matrix are acquired efficiently using some kind of method, for each of the channels. For example, the basis transformation matrix and its inverse matrix can be acquired for each channel using Lenstra-Lenstra-Lovasz (LLL) algorithm that is widely known to be a suboptimal. The LLL algorithm is disclosed in detail in D. Wubben et al., mentioned earlier, for example.

Numerical Handling of Lattice Point

As mentioned earlier, a transmission symbol is represented as a lattice point. Although it is mathematically sufficient, a lattice point is represented as a specific numeric value, in order to allow an algorithm to actually handle the lattice point. Each symbol vector component in the original lattice basis is the real-number component of a multi-valued modulation symbol. To express this symbol vector component more specifically, including the amplitude and the power, the component is expressed as follows.

$$s_i = A_e u_i \; u_i = -(M_{c2}-1), -(M_{c1}-3), \ldots -3, -1, 1, 3, \ldots (M_{c2}-3), (M_{c2}-1)$$

i=1, 2, . . . , N

The vector representation will be as follows.

$$s = A_e u$$

Where $A_e$ is represented as follows.

$$A_e = \sqrt{E_{s,N}} A$$

In a system model, it is possible to keep the properties unaffected even if an appropriate known constant vector is added or constant scaling is applied to the symbol "s", as long as the reception data is transformed simultaneously. Using this advantage, the symbol s is transformed in the following manner that the lattice point can be handled more easily.

$$s = A_e u \to s'$$
$$= \frac{s + A_e(M_{2c}-1)1}{2}$$
$$= A_e u'$$

$$u'_i = 0, 1, \ldots, M_{c2}-2, M_{c2}-1$$

1 is a vector having all one elements.

In the description below, to avoid confusion by increasing the number of unnecessary definitions of variables, the right-hand side is simply referred to as "s". A symbol point "z" resultant of the lattice reduction is re-defined by Equation (5).

Generation of Soft-Decision Data with MMSE

A process of generating soft-decision data with MMSE will now be explained. Soft-decision data is generated using MMSE following the steps below, as an example.

1) Estimate Optimal Symbol

Use the symbol value estimated with MMSE as the optimal symbol.

2) Estimate Opposing Symbol

Run independent Full-MLD on each of the layers of the reception signal acquired in a filter output representation at Step 1).

3) Generate Soft-Decision Data

Generate soft-decision data based on the difference between the likelihood of zero and the likelihood of one for each bit acquired from Full-MLD having been performed for each layer along the process at step 2).

Principles of Symbol Estimation with MMSE

Based on statistical properties, a filter coefficient matrix W is determined in such a manner that the target signal is retained but the noise signal component is reduced in each of the layers in the output from the linear filter transformation applied to the reception signal "y". In MMSE, the filter coefficient matrix W is calculated in such a manner that the root mean square of the estimation error in the estimated symbol is minimized. The root mean square J of the estimation error of the estimated symbol is expressed by the following equation, for example.

$$J=E[\|s-Wy\|^2]$$

Where E[●] denotes the expectation of an additional noise "n" (see Table 1).

The basic formula acquired as a result is as described below.

Definitions
1) Transmission Symbol: s
   Filter Output (Tentative Estimation): $\tilde{s}$
   Estimated Symbol Value: $\hat{s}$
2) Reception Signal: y
3) Weight Coefficient Matrix: $W=[w_1^\dagger, \ldots, w_N^\dagger]^T$
4) Autocorrelation Matrix: $R_{yy}=E[yy^\dagger]$
5) Correlation Matrix: $R_{ys}=E[ys^\dagger]=[z_1, \ldots, z_N]$
   $z_1=E[ys_i^*]$ Formulas $$\tilde{s} = Wy = \begin{bmatrix} w_1^\dagger \\ \vdots \\ w_N^\dagger \end{bmatrix}$$

$$y = \begin{bmatrix} w_1^\dagger y \\ \vdots \\ w_N^\dagger y \end{bmatrix} \Rightarrow \tilde{s}_j = w_j^\dagger y$$

$$W = R_{sy}^\dagger R_{yy}^{-1} = \begin{bmatrix} z_1^\dagger \\ \vdots \\ z_N^\dagger \end{bmatrix}$$

$$R_{yy}^{-1} = \begin{bmatrix} z_1^\dagger R_{yy}^{-1} \\ \vdots \\ z_N^\dagger R_{yy}^{-1} \end{bmatrix} \Rightarrow w_j^\dagger = z_j^\dagger R_{yy}^{-1} w_j = R_{yy}^{-1} z_j$$

The process of generating soft-decision data using MMSE will now be explained.

1) Generate Weight Matrix
1-1) Correlation Matrix Operation $$R_{yy}=E[yy^\dagger]=E_{s,N}HH^\dagger+N_0I_M$$

$$R_{ys}=E[ys^\dagger]=E_{s,N}H$$

1-2) Weight Matrix $$W=E_{s,N}H^\dagger(E_{s,N}HH^\dagger+N_0I_M)^{-1}=H^\dagger(HH^\dagger+\Gamma^{-1}I_M)^{-1}$$

where $\Gamma=E_{s,N}/N_0$

As a mathematically equivalent formula, the weight matrix W can also be expressed as follows.

$$W=(H^\dagger H+\Gamma^{-1}I_N)^{-1}H^\dagger$$

2) Estimate Soft-Decision Symbol
2-1) Multiply Weight $$\tilde{s}=Wy=Ls+Wn$$

$$\tilde{s}_j=w_j^\dagger y$$

2-2) Estimate Amplitude Division $$L=WH=H^\dagger(HH^\dagger+\Gamma^{-1}I_M)^{-1}H \text{ where } \Gamma=E_{s,N}/N_0$$

$$y_j' = \frac{\tilde{s}_j}{L_{jj}}$$

2-3) Calculate Dispersion of Effective Noise Components $$Z=\text{Diag}(WW^\dagger)$$

$$M=\text{Diag}(LL^\dagger)$$

$$\sigma_j^2 = \frac{1}{L_{jj}^2}(M_{jj} - L_{jj}^2 + \Gamma^{-1}Z_{jj})$$

Where Diag(X) represents a matrix containing only the diagonal elements of the matrix X.

3) Perform MLD in Unit of Symbol
3-1) Generate Replica $$\hat{y}'=s_j \ s_j \in C_{M_c}$$

3-2) Perform Metric Operation $$L(s_j) = \frac{1}{\sigma_j^2}|y' - \hat{y}|^2 = L_I(s_{j,I}) + L_Q(s_{j,Q})$$

$$L_I(s_{j,I}) = \frac{1}{\sigma_j^2}(y_I' - \hat{y}_I)^2$$

$$X = I, Q$$

3-3) Retrieve for Minimum Value $$\hat{s}_{j,X} = \arg \min_{s_j \in C_{M_c}} L_X(s_{j,X})$$

$$X = I, Q$$

Map the odd-numbered bit and the even-numbered bit of the mapping bits to I and Q, respectively.

$$\hat{s}_{j,I} \to u_{j,I}(\hat{s}_{j,I})=(\hat{u}_{(j-1)\times m_c+1}, \hat{u}_{(j-1)\times m_c+3} \cdots, \hat{u}_{(j-1)\times m_c+m_c-1})$$

$$\hat{s}_{j,Q} \to u_{j,Q}(\hat{s}_{j,Q})=(\hat{u}_{(j-1)\times m_c+2}, \hat{u}_{(j-1)\times m_c+4} \cdots, \hat{u}_{(j-1)\times m_c+m_c})$$

$$L_k(\hat{u}_k)=L_{j,X}(\hat{s}_{j,X})$$

4) Retrieve for Smallest Value of Opposing Bits of Respective Bits

Perform following operation to $k=(j-1)\times m_c+1, \ldots, (j-1)\times m_c+m_c$.

Opposing Bit of Estimated Bit: $\hat{u}_1{}^c = 1 - \hat{u}_1$ $$\hat{s}_k = \arg\min_{s_{j,X} \in C_{M_c,X}\,:\,b_k = \hat{u}_k^c} L_X(s_{j,X})$$

$$L_k(\hat{u}_k^c) = L_{j,X}(\hat{s}_k)$$

5) Calculate Posteriori Likelihood $$L_k = -(L_k(0) - L_k(1))/2$$

MMSE Turbo Equalizer

Let us now consider an extension of MMSE under an assumption that a prior probability is assigned to the transmission symbol. A block corresponding to a unit in which MMSE process is performed is herein referred to as a "component demodulation process". The component demodulation process is a process of receiving an input of likelihood data and outputting likelihood data that improves the properties. The properties can be improved by repeating this process. Such a process is generally referred to as "turbo equalizer". An MMSE-based extension acting as the component demodulation process is specifically referred to as an "MMSE turbo equalizer". The MMSE turbo equalizer is further classified into "Soft-MMSE" and "Hard-MMSE", depending on how the prior probability is used.

Soft-MMSE

By taking the prior probability into account, MMSE principle formula mentioned above is corrected. The point in this correction is that, because the meaning of the expectation operation E[●] is corrected, the measured quantities obtained from the operation are also corrected. In this case, the expectation operation is extended so that the expectation takes the prior probability of a given transmission symbol into account, in addition to the additional noise. The prior probability is acquired from the log-likelihood ratio. The detailed descriptions will now be provided.

Principle of Symbol Estimation through Soft-MMSE

Definitions

1) Expectation from Prior Probability

Let us assume herein that P(x) denotes the prior probability. An expectation E[X] of a measured quantity X, which is a function of the measurement x, is expressed as follows.

$$E[X] = \sum_x X(x) P(x)$$

2) Correlation Function $$\mathrm{Cov}(x,y) = E[xy^H] - E[x]E[y^H]$$

$$\mathrm{Cov}(x,y) = E[xy^*] - E[x]E[y^*]$$

Formula $$\tilde{s} = Wy + b = \bar{s} + W(y - H\bar{s}) \quad (6)$$

Where $$\bar{s} = E[s]$$

$$W = \mathrm{Cov}(s,y)\mathrm{Cov}(y,y)^{-1} = H^H(HVH^H + \Gamma^{-1}I_M)^{-1}$$

$$V = \mathrm{Cov}(s,s) = \mathrm{diag}(\sigma_{s_1}^2, \ldots, \sigma_{s_N}^2)$$

The $n^{th}$ element of Equation (6) is expressed as follows.

$$\tilde{s}_j = \bar{s}_j + W_j^H(y - H\bar{s})$$

It is assumed that, to acquire the estimation and the posteriori likelihood of the $n^{th}$ symbol, the effect of the prior probability of the $n^{th}$ symbol itself is removed. Such an assumption corresponds to the assumption below.

$$\bar{s}_n = 0$$

$$\sigma_{s_1}^2 = 1$$

Therefore, the following equation is finally acquired.

$$\tilde{s}_j = W_j^{\prime H}(y - H\bar{s}_j) \quad (7)$$

where $$W_j^{\prime H} = W_j^H\big|_{\sigma_n^2 = 1, \bar{s}_j = \bar{s}\big|_{\bar{s}_j = 0}}$$

Probability for Logarithmic Likelihood

Definitions

1) Modulation Symbol Mapping: $s \Leftrightarrow (b_1, \ldots, b_m)$
2) Bit Probability: $p_k(b)$
   Probability of Bit $b_k$ Taking Value $b \in \{0, 1\}$
3) Symbol Probability: $p(s)$
4) Logarithmic Likelihood Ratio: $L_k$
   Logarithmic Likelihood Ratio of Bit $b_k$ Formulas 1) Bit Probability $$p_k(b=0) = \frac{e^{L_k/2}}{e^{L_k/2} + e^{-L_k/2}}$$

$$p_k(b=1) = \frac{e^{-L_k/2}}{e^{L_k/2} + e^{-L_k/2}}$$

2) Symbol Probability $$p(s) = \prod_{k=0}^{m-1} p_k(b_k)$$

Hard-MMSE

Hard-MMSE can be considered as a special case of Soft-MMSE. In other words, Hard-MMSE specifies that a hard-decision symbol at one point in time is selected at the probability of one, as the prior probability. In this manner, an expectation of a symbol is matched with a "hard-decision symbol" acquired at that point in time, and the dispersion $\sigma_s^2$ of the symbol will be one. Therefore, Formula (7) can be expressed as follows.

$$\tilde{s}_j = w_j^H(y - H\hat{s}_j)$$

where $$\hat{s}_j = \hat{s}\big|_{\hat{s}_j = 0}$$

Where $w_j^H$ denotes the column vector of the weight matrix W when V=I (in the same manner as in the MMSE).

MMSE-SIC

MMSE-SIC is a correcting approach for improving the properties achieved by MMSE. MMSE-SIC corresponds to the Vertical-Bell Laboratories Layered Space-Time (V-BLAST), and the description below is provided under this assumption. V-BLAST supports Hard-MMSE, and extension to support Soft-MMSE is also possible. Hereinafter, MMSE-SIC supporting Hard-MMSE is referred to as MMSE-Hard-SIC (MMSE-HSIC), and MMSE-SIC supporting Soft-MMSE is referred to as MMSE-Soft-SIC (MMSE-SSIC).

MMSE-HSIC

To begin with, MMSE-HSIC performs transformation using a weight, by using MMSE. Each layer is then processed, following the order described later. For the first layer, symbol estimation is performed in the same manner as that in MMSE. For the second layer, the interference component included in the reception signal component in the second layer introduced by the symbol of the first layer is suppressed before the symbol estimation. The symbol estimation is then performed to the reception signal with interference noise reduced. An interference component is acquired from the estimated symbol. This is referred to as a "replica". In the same manner, for the $(i+1)^{th}$ layer and the layers thereafter, an interference component is removed from the reception signal using the replica generated from the $i^{th}$ estimated symbol and the preceding estimated symbols, and the same symbol estimation as that in MMSE is performed to the resultant reception signal.

It is preferable that symbols are sequentially estimated, and a symbol is selected in the descending order of the signal-to-noise ratio (SNR) every time the process is performed. The properties, however, do not always deteriorate greatly, even when this sequence is not followed strictly. Some schemes have also been developed to allow this order to be determined more efficiently. "SQRD-MMSE-SIC", which will be explained later, is one of the best schemes.

To simplify the description, it is assumed hereunder that some appropriate scheme is used to determine the order, and a layer selected through some appropriate matrix replacement is always replaced with the last index of the unprocessed layers. Therefore, it is assumed herein that the layers are processed in the order of j=N, N−1, . . . , 1.

Specific Steps

1) Process Layer N

Acquire the same weight as that used in MMSE, and multiply the weight to the reception signal. Acquire soft-decision data of the layer N component in the reception signal using MLD.

2) Process Layers i=N−1, . . . , 1

2-1) Generate Replica

Use estimated symbols (hard-decision symbols) corresponding to the layers up to the layer i+1 as replica symbols.

2-2) Canceling Interference $$\tilde{y}^{(i)} = \tilde{y}^{(i+1)} - h_{i+1}\hat{s}_{i+1} = y - \sum_{j=i+1}^{N} h_j \hat{s}_j \qquad (8)$$

2-3) Perform MLD

Based on the resultant reception data $\tilde{y}^{(i)}$, acquire the same weight as that in MMSE, and multiply the weight to the reception signal. Acquire soft-decision data of the layer i component in the reception signal, using MLD.

Remark

Equation (8) can be expressed as a channel model as follows.

$$\tilde{y}^{(i)} = H^{(i)} s^{(i)} + n^{(i)}$$

Where $H^{(i)} = [h_1\ h_2\ \ldots\ h_i]$, $s^{(i)} = [s_1, s_2, \ldots, s_i]^T$
$n^{(i)}$ is a noise component defined by $\tilde{y}^{(i)} - H^{(i)} s^{(i)}$.

Therefore, MMSE for a virtual channel response matrix $H^{(i)}$ can be applied to the $i^{th}$ layer.

MMSE-SSIC

MMSE-SSIC is generally the same as "MMSE-HSIC". The difference is that, while MMSE-HSIC uses MMSE in the symbol estimation for the layer i=N−1 and the layers thereafter, MMSE-HSIC uses Soft-MMSE instead. At this time, mapped to the "prior probability" that is a prior condition is a "posteriori log-likelihood ratio" obtained for the layers up to the $(i+1)^{th}$ layer.

MMSE-PIC

MMSE-PIC is a correcting approach for improving the properties achieved by MMSE. In the same manner as MMSE-SIC, MMSE-PIC is a scheme that uses an MMSE algorithm given with a prior probability. MMSE-PIC includes two different schemes for "Hard-MMSE" and "Soft-MMSE", respectively, that are referred to as "MMSE-HPIC" and "MMSE-SPIC", respectively. While SIC is a scheme that performs the process sequentially in units of a layer, PIC performs the process using the posteriori probability up to a specific point in time, as the prior condition for the layers other than the target layer.

MMSE-HPIC

In the component demodulation process in MMSE-HPIC, Hard-MMSE is applied to all of the layers j=1, . . . , N. Because the result of the process of one layer does not affect the process of the other layers, the layers can be processed in any order. MMSE-HPIC will now be explained in detail.

General Steps

Process the layers in the order of j=1, . . . , N.

Iterate the component demodulation process by a specified number of times.

Execute MMSE as an Initial Process before the iteration, to estimate the symbol of each of the layers.

Given a prior probability as a prior condition, iterate the component demodulation process described below.

Use Hard-MMSE to estimate the symbol for each of the layers.

In other words, generate a replica of the current estimated symbol, and remove the replica from the reception data, so that the interference component of the other layers is removed from the vector of the reception data.

Apply MMSE to the resultant reception signal.

Specific Steps

Initial Process

1) Apply MMSE

Acquire a log-likelihood ratio (soft-decision data) for each bit of the symbol component for the corresponding layer by applying MMSE described above to the reception data y and the channel response matrix H.

Component Demodulation Process

Iterate the following process for a specified number of times.

1) Acquire Symbol Estimation

Use hard-decision symbol resultant of the initial process or the previous component demodulation process as the estimated symbol $\hat{s}$.

2) Perform Replica Generation and Cancellation

Perform the following operation for the layers j=1, . . . , N, sequentially.

$$\tilde{y}_j = y - \sum_{\substack{l=1 \\ l \neq j}}^{N} h_l \hat{s}_l$$

3) Generate Soft-Decision Data

Perform the following operation for the layers j=1, . . . , N, sequentially.

Generate likelihood by applying MMSE to the following input data $\tilde{y}_j$, in the antenna configuration of 1×M.

MMSE-SPIC

MMSE-SPIC is a process corresponding to MMSE-HPIC but with Hard-MMSE replaced with Soft-MMSE.

Specific Steps
Initial Process
1) Apply MMSE

Acquire a log-likelihood ratio (soft-decision data) for each bit of the symbol component of the corresponding layer by applying MMSE described above to the reception data y and the channel response matrix H.

Component Demodulation Process

Iterate the following process for a specified number of times.

1) Acquire Symbol Estimation (Generate Expectation)

Acquire the expectation of the symbol $\bar{s}$ by mapping the log-likelihood ratio resultant of the initial process or the previous component demodulation process to the prior probability.

2) Perform Replica Generation and Cancellation

Perform the following operation for the layers j=1, ..., N, sequentially.

$$\tilde{y}_j = y - \sum_{\substack{l=1 \\ l \ne j}}^{N} h_l \bar{s}_l$$

3) Generate Soft-Decision Data

Perform the following operation for the layers j=1, ..., N, sequentially.

Generate likelihood by applying MMSE to the following input data $\tilde{y}_j$, in the antenna configuration of 1×M.

QRD-LD-SIC

QRD-LD-SIC, to begin with, performs QR decomposition to the channel response matrix, and then performs the coordinate conversion to the reception signal vectors using the orthogonal matrix resultant of the QR decomposition. In this manner, QRD-LD-SIC can remove a half of the interference components of other symbols from the channel model of the reception signal vectors. QRD-LD-SIC is a scheme that performs the combination of linear detection and SIC to the layers from the one with a smaller inter-symbol interference. The linear detection may be zero forcing (ZF) or MMSE, and these implementations are referred to as "QRD-ZF-SIC" and "QRD-MMSE-SIC", respectively.

QRD-ZF-SIC

QRD-ZF-SIC is a scheme that QR-decomposes the channel response matrix, and transforms the reception signal using the orthogonal matrix resultant of the QR-decomposition. To simplify the description, it is assumed herein that the process is performed in units of a layer, with the order of the matrix replaced to a predetermined processing order.

Specific Steps
Pre-Process
1) Perform QR Decomposition

Perform QR decomposition to the channel response matrix.

$$H=QR$$

Where Q is a unitary matrix satisfying the following relation.

$$Q^H Q = I$$

R is an upper triangular matrix including the elements as follows.

$$R = \begin{bmatrix} r_{11} & \cdots & r_{1N} \\ & \ddots & \vdots \\ 0 & & r_{NN} \end{bmatrix}$$

2) Perform Q-transformation of Reception Data

Linear-transform the reception signal vectors with the orthogonal matrix Q. As a result, the channel response matrix is transformed into the matrix R.

$$y' = Q^H y = Rs + n' \quad n' = Q^H n$$

The matrix R with the components is expressed as follows.

$$y'_j = \sum_{l=j}^{N} r_{jl} s_l + n'_j$$

Main Process
1) Process Layer j=N

The channel model for the reception data is expressed as follows.

$$y'_j = r_{jj} s_j + n'_j$$

1-1) Perform Synchronous Detection $$\tilde{s}_j = r_{jj}^{-1} y'_j$$

1-2) Generate Soft-Decision Data

Acquire the likelihood of each bit by applying one-symbol MLD to $\tilde{s}_j$.

1-3) Acquire Symbol Estimation
i) Acquire Hard-Decision
Select the nearest symbol.

$$\hat{s}_j = Q(\tilde{s}_j)$$

Where Q(●) is a selection function (also referred to as a "quantizing function").

ii) Acquire Soft-Decision

Generate the symbol probability from the likelihood, and calculate the expectation.

$$\hat{s} = \bar{s}_j$$

2) Process Layers j=N−1, ..., 1
2-1) Perform Replica Generation and Cancellation $$y'^{(j)}_j = y'_j - \sum_{l=j+1}^{N} r_{jl} \hat{s}_l = r_{jj} s_j + n'^{(j)}_j$$

2-2) Perform Synchronous Detection $$\tilde{s}_j = r_{jj}^{-1} y'_j$$

2-3) Generate Soft-Decision Data

Acquire the likelihood of each bit, by performing one-symbol MLD to $\tilde{s}_j$.

2-4) Acquire Symbol Estimation
i) Acquire Hard-Decision
Select the nearest symbol.

$$\hat{s}_j = Q(\tilde{s}_j)$$

ii) Acquire Soft-Decision

Generate the symbol probability from the likelihood, and calculate the expectation.

$$\hat{s}_j = \bar{s}_j$$

QRD-MMSE-SIC

QRD-MMSE-SIC is a scheme for achieving a balance between alleviating the amplification of the noise component introduced by ZF, and simplifying the SIC process with QR decomposition. Because QR decomposition is used, "extended channel response matrix" is introduced. In this manner, symbol estimation with MMSE can be replaced to a format that is the same as that of ZF, as specified below.

Definitions

1) Extended Channel Response Matrix: H $$\underline{H} = \begin{bmatrix} H \\ \sqrt{N_0} \, I_N \end{bmatrix}$$

2) Extended Reception Symbol Vector: y $$\underline{y} = \begin{bmatrix} y \\ 0_N \end{bmatrix}$$

3) Extended Noise Vector: n $$\underline{n} = \begin{bmatrix} n \\ \sqrt{N_0} \, s \end{bmatrix}$$

4) QR Decomposition
4-1) Q-Matrix: Q
4-2) R-Matrix: R
5) Pseudo-Inverse (PI) Matrix of Extended Channel Response Matrix: H⁺
5-1) Basic Definitions $$H^+ = (H^H H)^{-1} H^H \Rightarrow H^+ H = I_N$$

H is not a square matrix, but is a (M+N) N matrix. Although there is no ordinary inverse matrix, a Penrose-Moore pseudo inverse matrix defining these characteristics can be defined.

5-2) QR Decomposition

By QR-decomposing H, H⁺ is expressed as follows.

$$H^+ = R^{-1} Q^H$$

Formula
1) Channel Model $$y = Hs + n$$

2) Synchronous Detection $$\tilde{s} = H^+ y$$

♦ Remark $$\tilde{s} = H^+ y = (H^H H)^{-1} H^H y = Wy$$

Where W matches weight for MMSE.

SQRD-LD-SIC

QRD-LD-SIC has a disadvantage that the computational load increases, considering that the order in which the layers are processed is optimized using the SNR of the estimated symbols, as an index. In SQRD-DL-SIC, to address this issue, the order in which the layers are processed is determined in advance. As the way in which the processing order is determined, the order of bases in the QR decomposition is determined in the ascending order of the power, and the layers are processed in the reversal of the determined order. Such QR decomposition is referred to as "Sorted-QRD (SQRD)". In this manner, the processing order is determined merely by running QR decomposition once, and the SIC process can be performed completely independently from the process of determining processing order. The computational load is therefore reduced dramatically. Either SSIC or HSIC may be used as SIC in the SQRD scheme. QRD-MMSE-SIC using the SQRD scheme will be referred to as SQRD-MMSE-SIC.

SQRD-MMSE-HSIC

The basic steps are the same as those in "SQRD-MMSE-SIC" in the original basis demodulation scheme, within the scope of optimal symbol estimation. The lattice reduction is performed in the manner described above as a generally available example. While SQRD-MMSE-HSIC is SQRD-MMSE, SQRD-MMSE-HSIC can be an LLL algorithm that is based on the extended channel response matrix. At the same time, SQRD-MMSE-HSIC can also be understood as one of QR decomposition schemes. The LLL algorithm is an algorithm that selects basis vectors from those with a "smaller" size, and matches how SQRD determines the processing order. Therefore, we can use the order determined by the LLL algorithm as the processing order.

Specific Steps
Pre-Process

The following pre-process is performed once for each block that is a processing unit that can be rendered as having substantially the same channel value.

1) Perform Lattice Basis Transformation and QR Transformation

Perform lattice reduction transformation using the LLL algorithm, for example.

$$\tilde{H} = HT$$

Acquire a lattice reduction transformation matrix and its inverse matrix.

It is assumed herein, as an example, that the lattice reduction is performed with the channel response matrix QR-transformed. Therefore, using QR decomposition of the following original basis, $$H = QR$$

as an initial condition, acquire the transformed QR decomposition below directly with a lattice reduction algorithm.

$$\tilde{H} = \tilde{Q}\tilde{R}$$

<Main Process>

The following process is applied to all of the symbols in the block.

1) Linear-Transform Reception Signal Vectors Using Orthogonal Matrix Q

Through this process, the extended channel response matrix is transformed into an upper triangular matrix.

$$y' = \tilde{Q}^H y = \tilde{R} z + \eta \quad \eta = \tilde{Q}^H n$$

2) Process Layer j=N

The channel model for the reception data is expressed as:

$$y'_j = r_{jj} z_j + \eta_j$$

2-1) Perform Synchronous Detection $$\tilde{z}_j = r_{jj}^{-1} y'_j$$

2-2) Generate Soft-Decision Data

Acquire the likelihood of each bit, by performing one-symbol MLD to $\tilde{s}_j$.

2-3) Acquire Symbol Estimation

The nearest symbol is selected as the estimated symbol.

$$\hat{z}_j = Q(\tilde{z}_j)$$

3) Process Layers j=N−1, . . . , 1
3-1) Perform Replica Generation and Cancellation $$y'^{(j)}_j = y'_j - \sum_{i=j+1}^{N} r_{ji}\hat{z}_i = r_{jj}z_i + \eta^{(j)}_j$$

Where $\eta^{(j)}_j$ is a noise component defined by $\eta^{(j)}_j = y'^{(j)}_j - r_{jj}z_i$.

3-2) Perform Synchronous Detection $$\tilde{z}_j = r_{jj}^{-1} y'_j$$

3-3) Acquire Symbol Estimation
The nearest symbol is selected as the estimated symbol.

$$\hat{z}_j = Q(\tilde{z}_j)$$

4) Perform Inverse-Transformation into Original Basis
Perform the inverse transformation into the expression in the original basis. The result of this inverse transformation, however, does not necessarily correspond to the modulation symbol in the original basis. Therefore, if the result exceeds the range, perform a clipping process.
4-1) Perform Inverse Transformation $$\hat{s} = T\hat{z}$$

4-2) Perform Clipping

If $\hat{s}_i > s_{max} = A_e (M_{c2}-1)$, then $\hat{s}_i = s_{max}$     (1)

If $\hat{s}_i < s_{min} = 0$, then $\hat{s}_i = 0$     (2)

[a] First Embodiment

A first embodiment will now be explained. In this embodiment, the communication system 10 illustrated in FIG. 1 is assumed. A more specific example of the assumed system example is the downlink data packet channel specified in long term evolution (LTE) and LTE-advanced defined by third generation partnership project (3GPP). Assumed as the downlink data packet channel is a physical downlink shared channel (PDSCH), for example.

Figure 3:
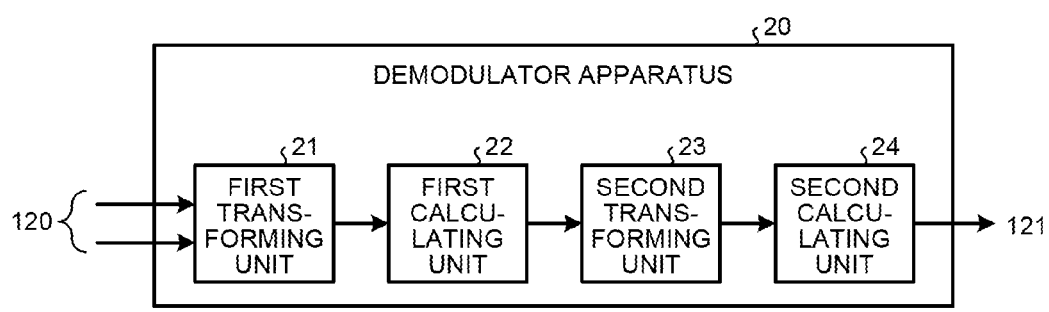
FIG. 3 is a block diagram illustrating an exemplary demodulator apparatus.

FIG. 3 is a block diagram illustrating an exemplary demodulator apparatus 20. The demodulator apparatus 20 includes a first transforming unit 21, a first calculating unit 22, a second transforming unit 23, and a second calculating unit 24.

The first transforming unit 21 decomposes the channel response matrix into the product of an orthogonal matrix and an upper triangular matrix. The first transforming unit 21 also calculates a lattice reduction transformation matrix and its inverse matrix for the channel response matrix, and applies the lattice reduction to the orthogonal matrix and the upper triangular matrix.

The first calculating unit 22 calculates an expectation of a symbol in the lattice-reduced basis by performing linear detection to the reception signal in the lattice-reduced basis, using the orthogonal matrix having been applied with lattice reduction transformation. In this embodiment, the first calculating unit 22 outputs a hard-decision symbol as the expectation of the symbol. In this embodiment, the first calculating unit 22 performs SQRD-MMSE-HSIC as the linear detection in the lattice-reduced basis, as an example.

The second transforming unit 23 inversely transforms the symbol expectation calculated by the first calculating unit 22 from the lattice-reduced basis into the original basis.

The second calculating unit 24 performs the interference cancellation method in the symbol expectation having been inversely transformed by the second transforming unit 23, in the original basis, and calculates the soft-decision data. In this embodiment, the second calculating unit 24 performs MMSE-HPIC as the interference cancellation method in the original basis, as an example.

Specific Steps
Pre-Process
The first transforming unit 21 performs this pre-process once, for example, to a block that is a processing unit that can be rendered as having substantially the same channel value.

1) Perform Lattice Basis Transformation and QR Transformation

The first transforming unit 21 performs the lattice reduction described below using the LLL algorithm, based on the channel response matrix H received from the MIMO receiver 120, for example, and calculates the transformation matrix and its inverse matrix.

$$\tilde{H} = HT$$

The first transforming unit 21 then QR-decomposes the extended channel response matrix into an orthogonal matrix and an upper triangular matrix using the LLL algorithm, for example, and performs the lattice reduction with the extended channel response matrix QR-decomposed. The first transforming unit 21, therefore, executes the lattice reduction algorithm using the QR decomposition in the original lattice below as an initial condition.

$$H = QR$$

Where Q is the orthogonal matrix, and R is an upper triangular matrix.

The first transforming unit 21 then acquires the QR decomposition applied with the lattice reduction transformation.

$$\tilde{H} = \tilde{Q}\tilde{R}$$

The first transforming unit 21 then outputs the lattice reduction transformation matrix, the inverse matrix of the lattice reduction transformation matrix, the orthogonal matrix applied with the lattice reduction transformation, and the upper triangular matrix applied with the lattice reduction transformation to the first calculating unit 22.

Main Process
The first calculating unit 22 runs the following process to all of the symbols in the block.

1) Linear-Transform Reception Signal Vectors Using Orthogonal Matrix
Through this process, the extended channel response matrix is transformed into an upper triangular matrix.

$$y' = \tilde{Q}^H y = \tilde{R} z + \eta \quad \eta = \tilde{Q}^H n \quad (9)$$

2) Process Layers j=N, . . . , 1
The channel model for the reception data is expressed as below.

$$y'_j = r_{jj} z_j + \eta_j \quad (10)$$

2-1) Perform Replica Generation and Cancellation
When j=N, the first calculating unit 22 performs the process of replica generation and cancellation based on the equation below.

$$y'^{(j)}_j = y'_j = r_{jj} z_j + \eta_j \quad (11)$$

If j<N, the first calculating unit 22 performs the process of replica generation and cancellation based on:

$$y'^{(j)}_j = y'_j - \sum_{i=j+1}^{N} r_{ji}\hat{z}_i = +\eta^{(j)}_j$$

Where $\eta^{(j)}_j$ is a noise component defined by $\eta^{(j)}_j = y'^{(j)}_j - r_{jj}z_i$.

2-2) Perform Synchronous Detection

The first calculating unit 22 performs the synchronous detection based on following:

$$\tilde{z}_j = r_{jj}^{-1} y'^{(j)}_j \quad (12)$$

2-3) Acquire Symbol Estimation

The first calculating unit 22 then makes the hard-decision based on the following calculation. The first calculating unit 22 selects the nearest symbol, and outputs the selected hard-decision symbol to the second transforming unit 23 as the estimated symbol.

$$\hat{z}_j = Q(\tilde{z}_j) \quad (13)$$

$\tilde{z}_j$ is an estimated symbol including noise, and $\hat{z}_j$ is an estimated symbol not including noise, estimated in the lattice.

3) Perform Inverse-Transformation into Original Basis

The second transforming unit 23 inversely transforms the symbol estimated by the first calculating unit 22 into the format of the original lattice-reduced basis. The result of this inverse transformation, however, does not necessarily correspond to the modulation symbol in the original lattice basis. The second transforming unit 23 therefore performs a clipping process when the result exceeds the range.

3-1) Perform Inverse Transformation

The second transforming unit 23 performs the inverse transformation based on the equation below.

$$\hat{s} = T\hat{z}$$

3-2) Perform Clipping

The second transforming unit 23 performs clipping based on the equation below:

If $\hat{s}_i > s_{max} = A_e(M_{c2}-1)$, then $\hat{s}_i = s_{max}$ \quad (1)

If $\hat{s}_i < s_{min} = 0$, then $\hat{s}_i = 0$ \quad (2)

4) Apply MMSE-HPIC Component Demodulation Process

The second calculating unit 24 then iterates the MMSE-HPIC component demodulation process by the number of times equal to $k_{max}$, using the estimated symbol having been inversely transformed into the original basis by the second transforming unit 23. $k_{max}$ is a constant defining the number of iterations. In this embodiment, $k_{max}$ is set to two, as an example.

In ordinary MMSE-HPIC, as described earlier, a hard-decision symbol is calculated by the initial process, and the component demodulation process is executed using the calculated hard-decision symbol. By contrast, in the MMSE-HPIC component demodulation process according to the embodiment, the second calculating unit 24 performs the first component demodulation process, being the first among the $k_{max}$ iterations, using the hard-decision symbol inversely transformed into the original basis by the second transforming unit 23. In the second and thereafter iterations among the $k_{max}$ iterations, the second calculating unit 24 performs the component demodulation process using the hard-decision symbol calculated in the previous MMSE-HPIC component demodulation process.

4-1) Perform Replica Generation and Cancellation

The second calculating unit 24 performs replica generation and cancellation for each of the layers j=1, ..., N, based on the equation below.

$$\tilde{y}_j = y - \sum_{\substack{l=1 \\ l \neq j}}^{N} h_l \hat{s}_l \quad (14)$$

4-2) Generate Soft-Decision Data

For each of the layers j=1, ..., N, the second calculating unit 24 generates soft-decision data by performing MMSE described above in the 1×M antenna configuration, using $\tilde{y}_j$ as input data. The second calculating unit 24 then iterates the processes explained at 4-1) and 4-2) by k times, and outputs the generated soft-decision data to the decoder 121.

Operation of Demodulator Apparatus 20

Figure 4:
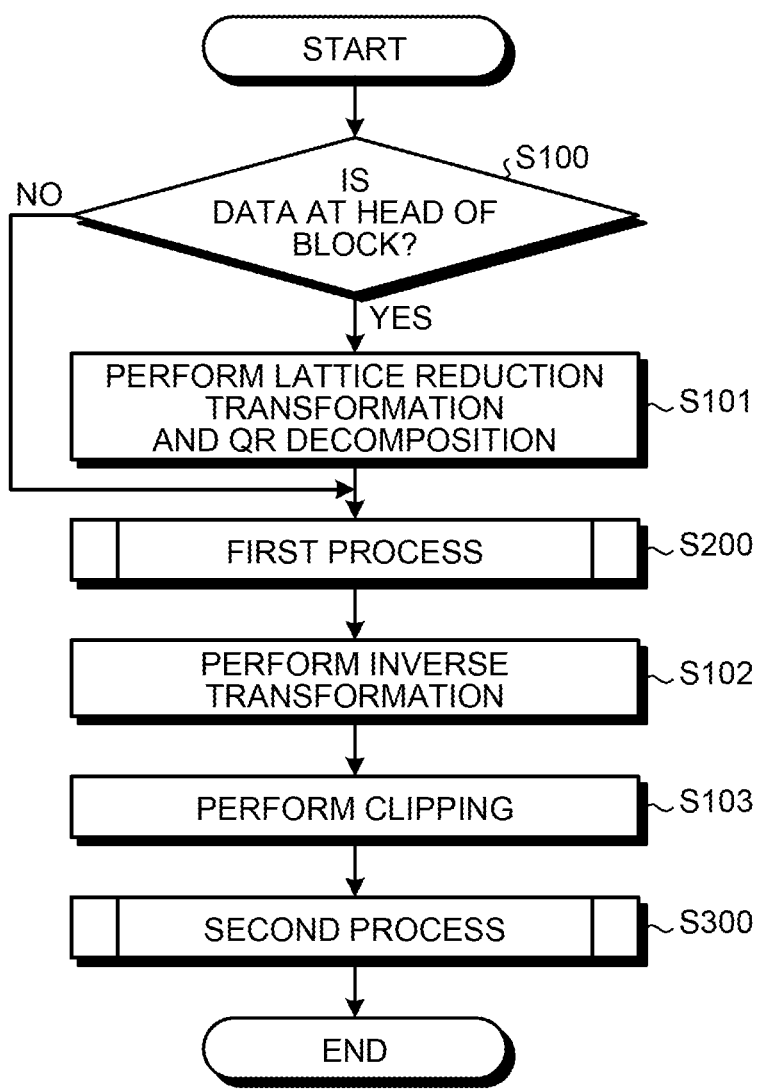
FIG. 4 is a flowchart illustrating an exemplary demodulation process according to a first embodiment.

FIG. 4 is a flowchart illustrating an exemplary demodulation process according to the first embodiment. Every time the MIMO receiver 120 outputs reception signal data, for example, the demodulator apparatus 20 initiates the demodulation process illustrated in this flowchart.

To begin with, the first transforming unit 21 determines whether the data at the head of the resources block is output from the MIMO receiver 120 (S100). If the data at the head of the resources block has not been output from the MIMO receiver 120 (No at S100), the first calculating unit 22 executes the process at Step S200.

If the data at the head of the resources block has been output from the MIMO receiver 120 (Yes at S100), the first transforming unit 21 performs the "pre-process" described earlier. Specifically, using LLL algorithm or the like, the first transforming unit 21 performs the lattice reduction transformation based on the extended channel response matrix. The first transforming unit 21 then calculates the transformation matrix and its inverse matrix.

The first transforming unit 21 then decomposes the channel response matrix into the product of an orthogonal matrix and an upper triangular matrix, by applying QR decomposition to the extended channel response matrix. The first transforming unit 21 then performs the lattice reduction transformation with the QR-decomposition of the extended channel response matrix. The first transforming unit 21 then outputs the lattice reduction transformation matrix, the inverse matrix of the lattice reduction transformation matrix, the orthogonal matrix applied with the lattice reduction transformation, and the upper triangular matrix applied with the lattice reduction transformation to the first calculating unit 22 (S101).

The first calculating unit 22 then performs linear detection in the lattice-reduced basis for the reception signal using the orthogonal matrix applied with lattice reduction transformation acquired by executing a first process which will be described later, and calculates an expectation of the symbol in the lattice-reduced basis (S200). The first process includes, among the processes of "Main Process" described above, "1) Linear-Transform Reception Signal Vectors using Orthogonal Matrix", and "2) Process Layers j=N, ..., 1". In this embodiment, an expectation of a symbol is a hard-decision symbol. The second transforming unit 23 then inversely transforms the hard-decision symbol output from the first calculating unit 22 from the lattice-reduced basis into the expression of the original basis (S102). The second transforming unit 23 then clips the hard-decision symbol exceeding a predetermined range (S103).

The second calculating unit 24 then performs the interference cancellation method in the inversely transformed hard-decision symbol in the original basis by executing a second process which will be described later, and generates soft-decision data (S300). The second calculating unit 24 then outputs the generated soft-decision data to the decoder 121. The second process includes "4) Apply MMSE-HPIC Component Demodulation Process" in "Main Process" described above. The demodulator apparatus 20 then ends the process illustrated in the flowchart.

First Process

Figure 5:
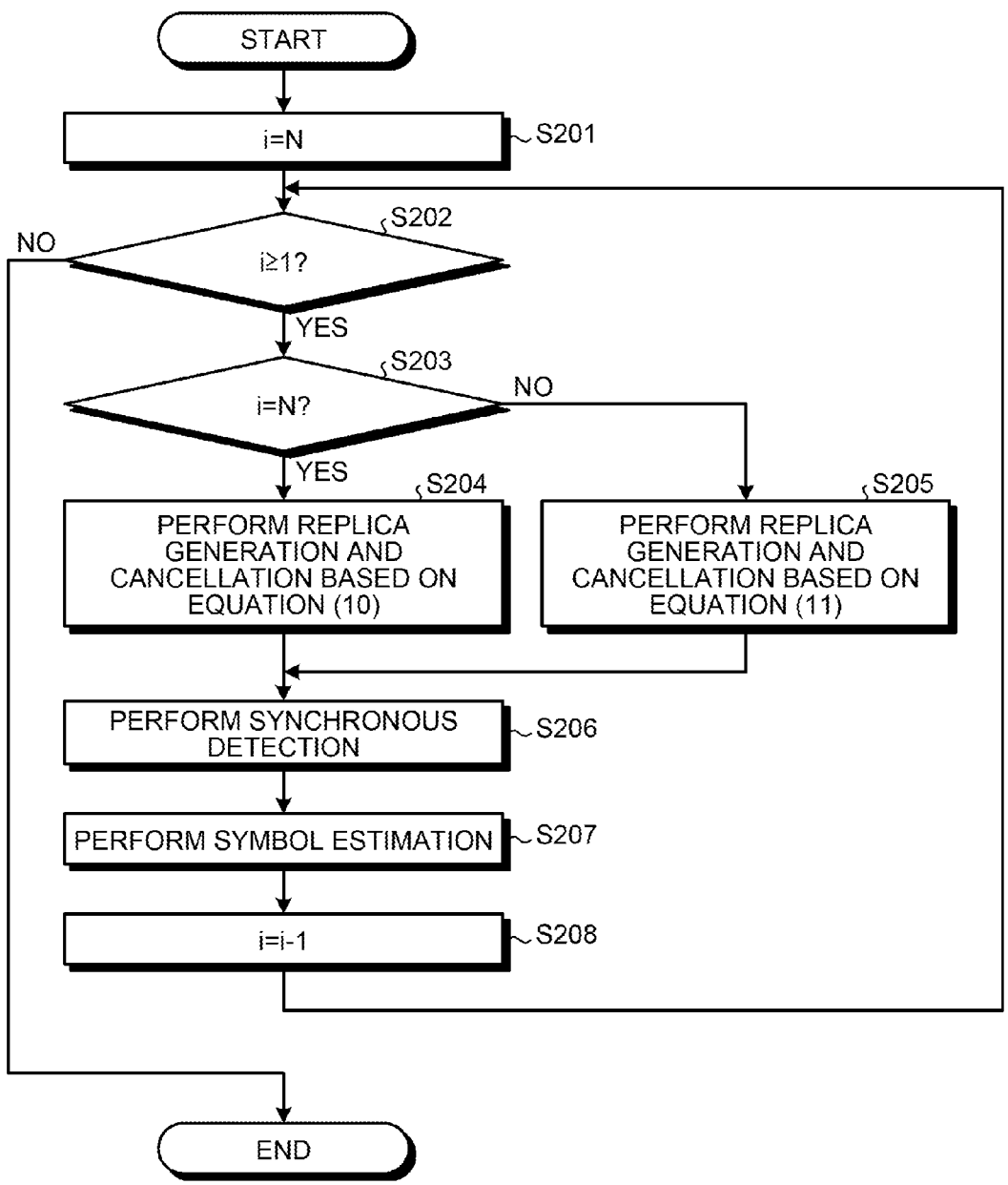
FIG. 5 is a flowchart illustrating an exemplary first process according to the first embodiment.

FIG. 5 is a flowchart illustrating an exemplary first process according to the first embodiment.

To begin with, the first calculating unit 22 sets N that is the number of transmission antennas (the number of layers) to the variable i (S201). The first calculating unit 22 then determines whether the value of the variable i is equal to or more than one (S202). If the value of the variable i is equal to or more than one (Yes at S202), the first calculating unit 22 then determines whether the value of the variable i is N (S203).

If the value of the variable i is N (Yes at S203), the first calculating unit 22 linear-transforms the reception signal vectors based on Equation (9). The first calculating unit 22 then performs the process of replica generation and cancellation based on Equation (10) (S204), and executes the process at Step S206.

If the value of the variable i is not N (No at S203), the first calculating unit 22 linear-transforms the reception signal vectors based on Equation (9). The first calculating unit 22 then performs the process of replica generation and cancellation based on Equation (11) (S205). The first calculating unit 22 then performs the synchronous detection in the reception signal vectors having the interference component cancelled, based on Equation (12) (S206).

The first calculating unit 22 makes the hard-decision by applying the selection function to the output of the synchronous detection, and performs the symbol estimation (S207). The first calculating unit 22 then outputs the estimated symbol to the second transforming unit 23. The first calculating unit 22 then decrements the value of the variable i by one (S208), and performs the process at Step S202 again. If the value of the variable i becomes less than one (No at S202), the first calculating unit 22 ends the first process illustrated in the flowchart.

Second Process

Figure 6:
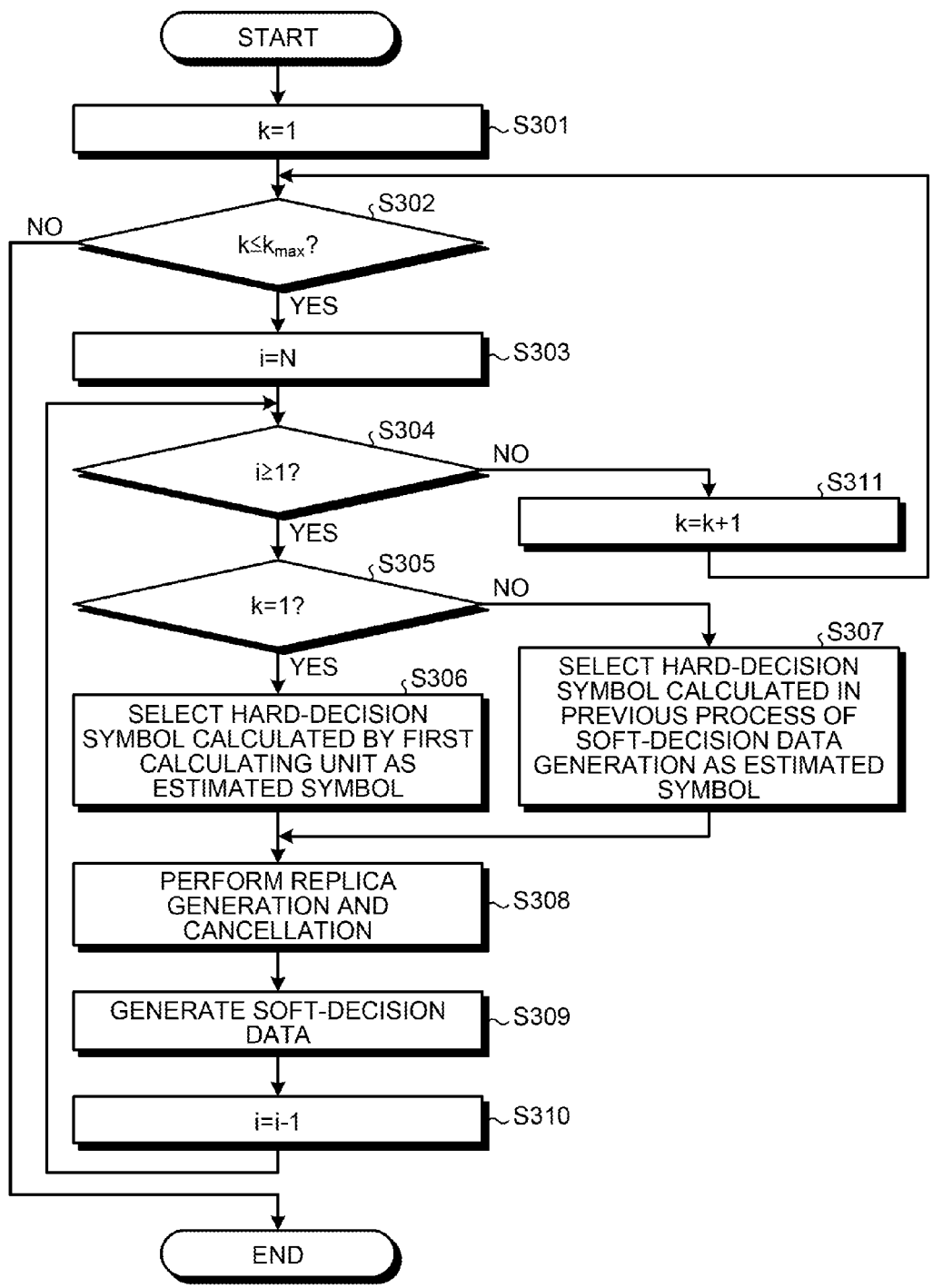
FIG. 6 is a flowchart illustrating an exemplary second process according to the first embodiment.

FIG. 6 is a flowchart illustrating an example of the second process according to the first embodiment.

To begin with, the second calculating unit 24 sets a variable k for counting the number of iterations to one (S301). The second calculating unit 24 then determines whether the value of the variable k is equal to or less than $k_{max}$ (S302). If the value of the variable k is equal to or less than $k_{max}$ (Yes at S302), the second calculating unit 24 sets N that is the number of transmission antennas (the number of layers) to the variable i (S303). The second calculating unit 24 then determines whether the value of the variable i is equal to or more than one (S304).

If the value of the variable i is equal to or more than one (Yes at S304), the second calculating unit 24 determines whether the value of the variable k is one (S305). If the value of the variable k is one (Yes at S305), the second calculating unit 24 selects the hard-decision symbol calculated by the first calculating unit 22 as the estimated symbol (S306). If the value of the variable k is not one (No at S305), the second calculating unit 24 selects the hard-decision symbol calculated previously in the process of generating soft-decision data (Step S309 which will be described later) (in the previous iteration), as the estimated symbol (S307).

The second calculating unit 24 then performs the process of replica generation and cancellation using the estimated symbol selected at Step S306 or S307, based on Equation (14) (S308). The second calculating unit 24 then generates soft-decision data by performing MMSE described above in the 1×M antenna configuration, using the reception signal vectors having the interference component cancelled (S309). The second calculating unit 24 then decrements the value of the variable i by one (S310), and performs the process at Step S304 again.

If the value of the variable i becomes less than one (No at S304), the second calculating unit 24 adds one to the variable k (S311), and performs the process at Step S302 again. If the value of the variable k is greater than $k_{max}$ (No at S302), the second calculating unit 24 outputs the soft-decision data corresponding to each of the estimated symbols to the decoder 121, and ends the process illustrated in the flowchart.

As described above, the demodulator apparatus 20 according to this embodiment acquires a tentative optimal symbol by performing linear detection in the lattice-reduced basis, cancels interference in the acquired tentative optimal symbol in the original basis, and outputs the soft-decision data. In this manner, the computational load can be reduced compared with the QRM-MLD using lattice reduction, and reception performance equivalent to that with QRM-MLD using lattice reduction can be achieved.

[b] Second Embodiment will now be explained. In the first embodiment, a hard-decision symbol is estimated with linear detection in the lattice-reduced basis. By contrast, this embodiment is different from the first embodiment in that a soft-decision symbol is estimated with linear detection in the lattice-reduced basis. The approach according to the embodiment for acquiring an estimation of the soft-decision symbol in the linear detection in the lattice-reduced basis is referred to as SQRD-MMSE-SSIC.

Furthermore, in this embodiment, the soft-decision symbol estimated in the linear detection in the lattice-reduced basis is not used as a candidate the transmission symbol, but used as an expectation that is calculated using a probability distribution as a weight. In this embodiment, after the expectation of a symbol calculated with the linear detection in the lattice-reduced basis is inversely transformed into the original basis, likelihood data is acquired using MMSE-SPIC-based interference cancellation method. In order to acquire the expectation of a optimal symbol, an expectation is acquired for the symbol corresponding to each layer in the lattice-reduced basis. Therefore, a range of possible values is estimated, in the lattice-reduced basis, for the symbol corresponding to each of the layers.

Specific Steps

Pre-Process

Because this pre-process is the same as that explained in the first embodiment, an explanation thereof is omitted herein.

Main Process

1) Linear-Transform Reception Signal Vectors Using Orthogonal Matrix

Because this process is the same as that explained in the first embodiment, an explanation thereof is omitted herein.

2) Process Layers j=N, . . . , 1

2-1) Perform Replica Generation and Cancellation

Because this process is the same as that explained in the first embodiment, an explanation thereof is omitted herein.

2-2) Perform Synchronous Detection

Because this process is the same as that explained in the first embodiment, an explanation thereof is omitted herein.

2-3) Acquire Symbol Estimation Range

For a layer equal to or more than j+1, the first calculating unit 22 calculates a range satisfying the conditions of the value the original symbol can take, with an assumption of the optimal symbol at this point in time, using the transformation equation below.

$$z = T^{-1} s$$

The group of symbols within the calculated range is expressed as follows.

$$\tilde{C}_j$$

2-4) Perform Symbol Expectation Operation

The first calculating unit 22 calculates an expectation of the symbol using the following calculation.

$$\bar{z}_j = \sum_{z \in \tilde{C}_j} z p_j(z) \quad (15)$$

$$p_j(z) = \frac{e^{-L_j(z)}}{\sum_{z \in \tilde{C}_j} e^{-L_j(z)}}$$

Equation (15) assumes that the noise has a Gaussian distribution. Where, $L_j(z)$ is a metric of a candidate symbol z, and because the lattice-reduced basis is near a perpendicular relation, $L_j(z)$ can be expressed as follows.

$$L_j(z) = \frac{1}{\sigma^2} |z - \bar{z}_j|^2$$

3) Perform Inverse-Transformation into Original Basis 3-1) Perform Inverse Transformation The second transforming unit 23 inversely transforms the symbol expectation calculated by the first calculating unit 22 from the lattice-reduced basis into the original basis based on Equation below.

$$\hat{s} = T \bar{z}.$$

3-2) Perform Clipping

Because this process is the same as that explained in the first embodiment, an explanation thereof is omitted herein.

4) Perform Component Demodulation Process in MMSE-SPIC

The second calculating unit 24 then iterates the following process by $k_{max}$ times using the symbol expectation having been inversely transformed into the original basis by the second transforming unit 23. In the ordinary MMSE-SPIC, as described earlier, a soft-decision symbol is calculated in the Initial Process, and the component demodulation process is executed using the calculated soft-decision symbol.

In the component demodulation process in MMSE-SPIC according to the embodiment, however, the second calculating unit 24 performs the first component demodulation process, being the first of the $k_{max}$ iterations, using the expectation having been inversely transformed into the original basis by the second transforming unit 23. By contrast, in the second component demodulation process and thereafter in the $k_{max}$ iterations, the second calculating unit 24 uses the symbol expectation calculated in the previous MMSE-SPIC.

4-1) Perform Replica Generation and Cancellation

The second calculating unit 24 performs replica generation and cancellation for each of the layers j=1, . . . , N, based on Equation (14). When the number of iterations k is one, the second calculating unit 24 performs replica generation and cancellation by assigning the expectation having been inversely transformed into the original basis by the second transforming unit 23 as the estimated symbol in Equation (14). If the number of iterations k is equal to or more than two, the second calculating unit 24 performs replica generation and cancellation by assigning the symbol expectation calculated in the previous MMSE-SPIC as the estimated symbol in Equation (14).

4-2) Generate Soft-Decision Data

The second calculating unit 24 generates soft-decision data, for each of the layers j=1, . . . , N, by using $\tilde{y}_j$ as input data, and performing MMSE described above in the 1×M antenna configuration.

4-3) Acquire Soft-Decision Symbol Estimation

The second calculating unit 24 maps the generated soft-decision data to a prior probability, and acquires the following symbol expectation.

$$\hat{s} = \bar{s}$$

Operation of Demodulator Apparatus 20

An operation of the demodulator apparatus 20 according to this embodiment is generally the same as the first embodiment explained with reference to FIG. 4, except that the first process (S200) and the second process (S300) according to this embodiment are partly different from those in the first embodiment.

First Process

Figure 7:
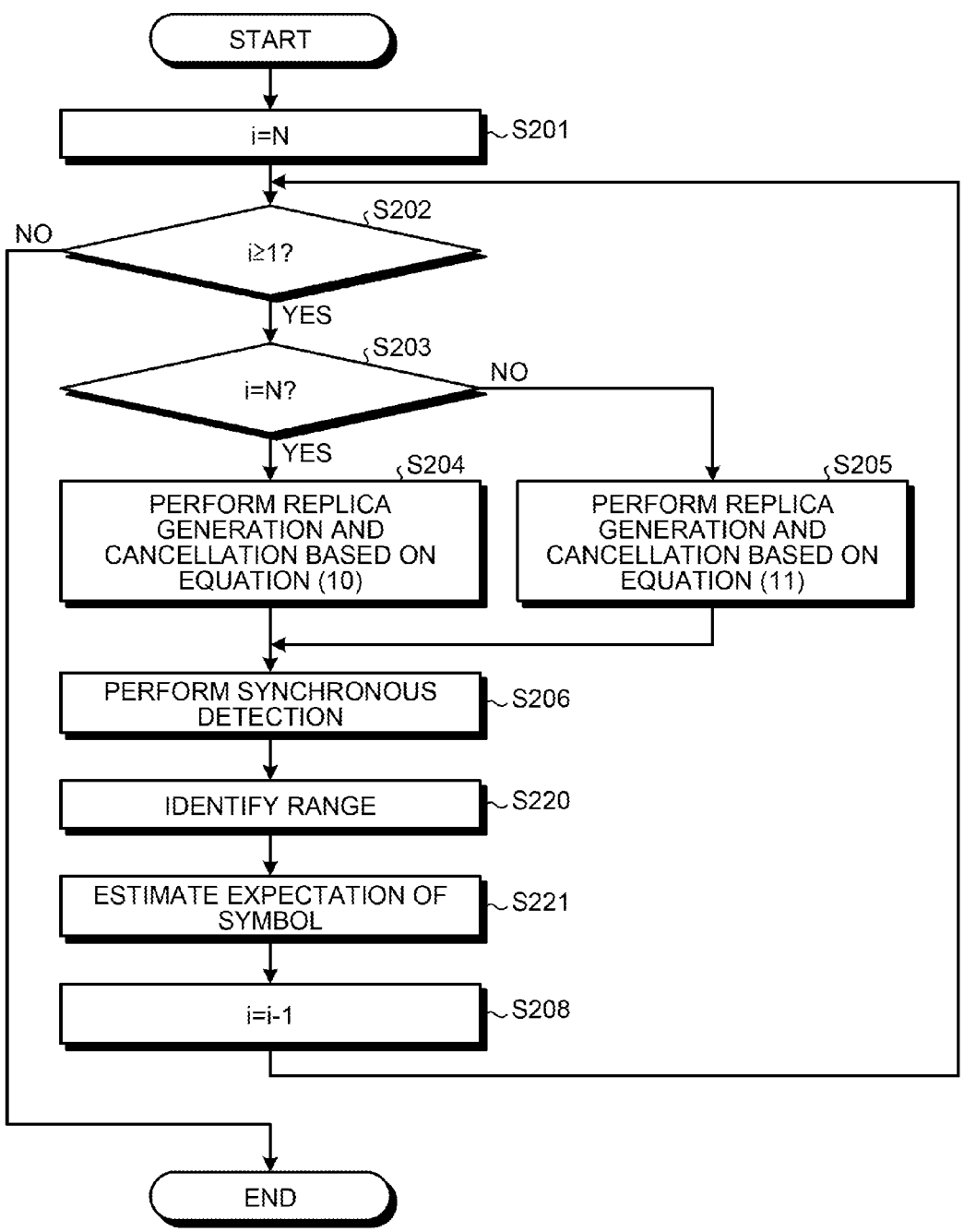
FIG. 7 is a flowchart illustrating an exemplary first process according to a second embodiment.

FIG. 7 is a flowchart illustrating an exemplary first process according to the second embodiment. Because the processes assigned with the same reference numerals in FIG. 7 as those in FIG. 5 are the same as those explained in FIG. 5, except for the point described below, redundant explanation thereof are omitted herein.

After the process at Step S206, for a layer equal to or more than the layer j+1, the first calculating unit 22 estimates a range satisfying the conditions of the value the original symbol can take, given the optimal symbol at this point in time (S220). The first calculating unit 22 then estimates an expectation of the symbol based on Equation (15) (S221). The first calculating unit 22 then executes the process at Step S208.

Second Process

Figure 8:
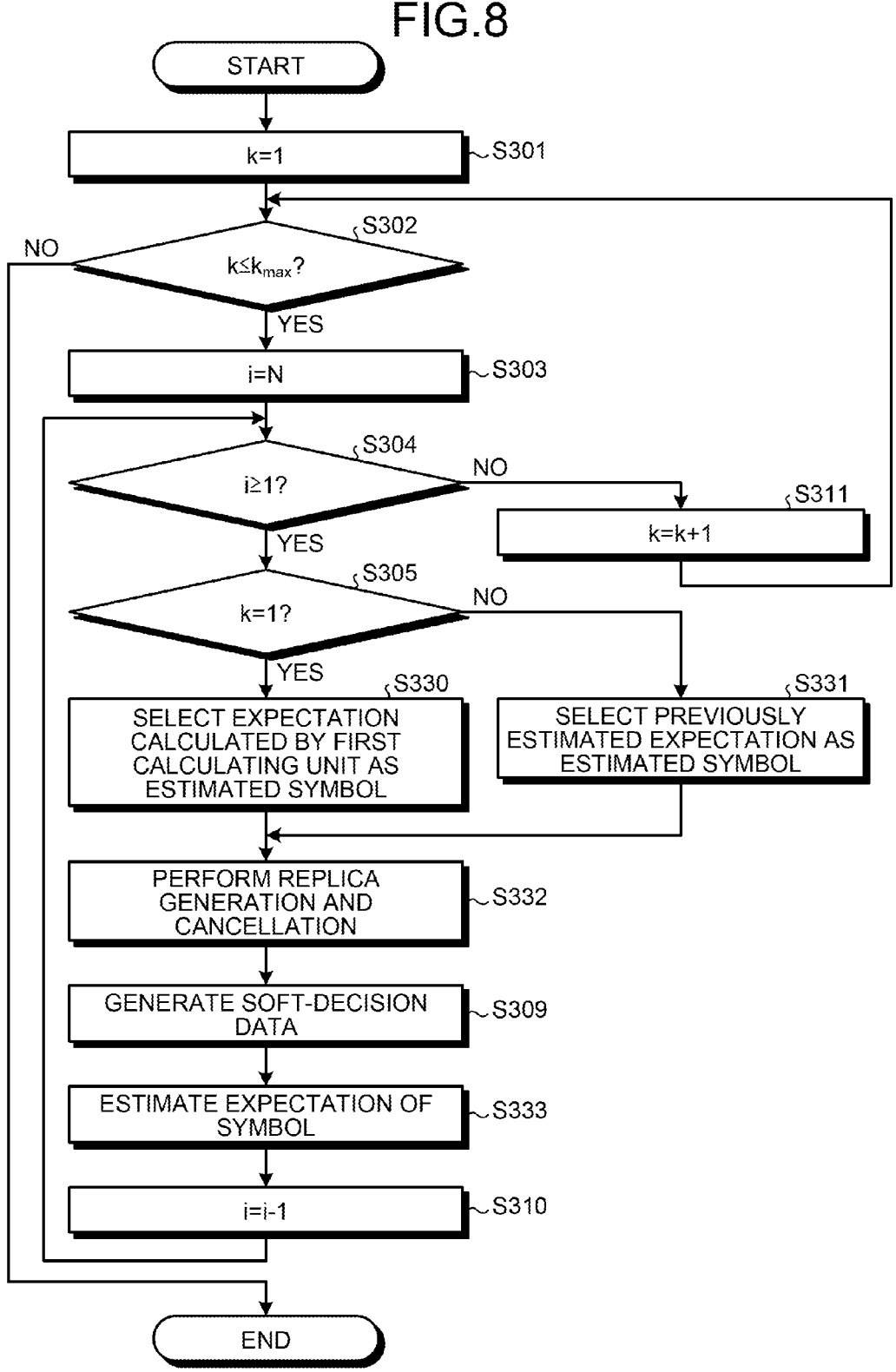
FIG. 8 is a flowchart illustrating an exemplary second process according to the second embodiment.

FIG. 8 is a flowchart illustrating an exemplary second process according to the second embodiment. Because the processes assigned with the same reference numerals in FIG. 8 as those in FIG. 6 are the same as those explained in FIG. 6, except for the point described below, redundant explanation thereof are omitted herein.

If the value of the variable k is one (Yes at S305), the second calculating unit 24 selects the expectation calculated by the first calculating unit 22 as the estimated symbol (S330). If the value of the variable k is not one (No at S305), the second calculating unit 24 selects the expectation calculated previously in the process of symbol expectation estimation (in the previous iteration) (the process at Step S333 described later) as the estimated symbol (S331).

The second calculating unit 24 then performs replica generation and cancellation using the estimated symbol selected at Step S330 or S331, based on Equation (14) (S332). The second calculating unit 24 then generates soft-decision data by performing MMSE (S309), maps the generated soft-decision data to the prior probability, and calculates the symbol expectation (S333). The second calculating unit 24 then executes the process at Step S310.

Simulation Result

Figure 9:
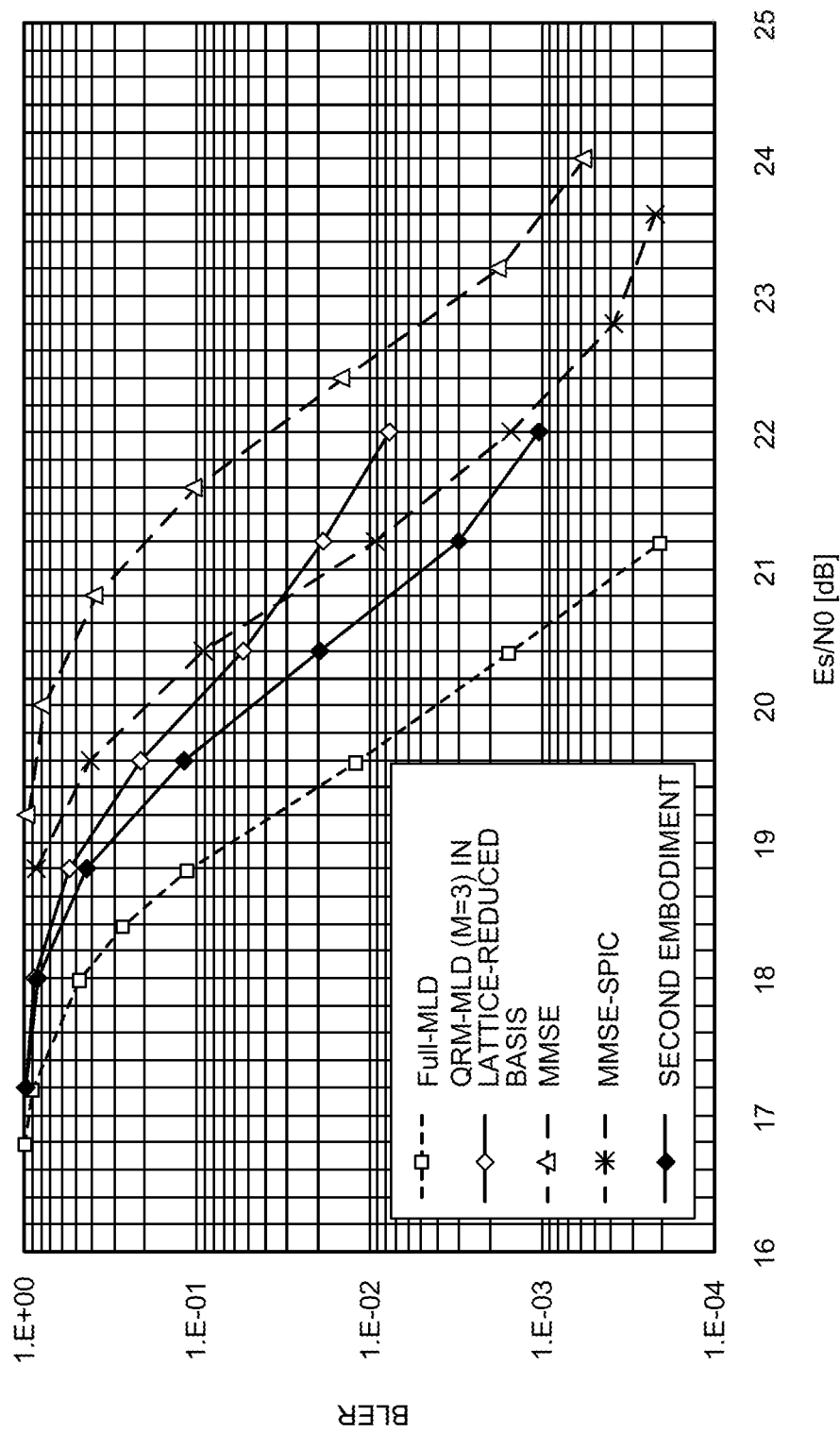
FIG. 9 is a schematic of an exemplary simulation result representing a reception characteristic of a demodulator apparatus according to the second embodiment.

FIG. 9 is a schematic of an exemplary simulation result representing a reception characteristic (block error rate (BLER)) of the demodulator apparatus 20 according to the second embodiment. For the purpose of comparison, reception characteristics of Full-MLD, QRM-MLD (M=3) in the lattice-reduced basis, MMSE, and MMSE-SPIC are also illustrated in FIG. 9. MMSE and MMSE-SPIC illustrated in FIG. 9 are not the process in the lattice-reduced basis, but in the original basis. The simulation illustrated in FIG. 9 assumes conditions such as an information bits size K of 1536, a modulation scheme of 16QAM, an encoding rate R of 8/9, and the number of antennas used in transmissions and receptions of 2×2. An assumed fading model is Rayleigh fading.

As illustrated in FIG. 9, the demodulator apparatus 20 according to this embodiment exhibits better reception characteristics than those of MMSE or MMSE-SPIC, which are representative linear detections. Furthermore, the demodulator apparatus 20 according to this embodiment exhibits better reception characteristics than QRM-MLD in the lattice-reduced basis, when M=3. Furthermore, the demodulator apparatus 20 according to this embodiment exhibits reception characteristics that are somewhat lower than, but near those achieved by Full-MLD. The demodulator apparatus 20 according to this embodiment is a scheme in which the linear detection in the lattice-reduced basis is combined with the interference cancellation method, and computational load of the demodulator apparatus 20 according to this embodiment is smaller than that of MLD. As may be clear from FIG. 9, computational load of the demodulator apparatus 20 according to this embodiment is smaller than that of QRM-MLD using lattice reduction, and the demodulator apparatus 20 according to this embodiment achieves reception performance equivalent to or higher than QRM-MLD using the lattice reduction.

[c] Third Embodiment

A third embodiment will now be explained. In the second embodiment, to allow SQRD-MMSE-SSIC in the lattice-reduced basis to generate an expectation of a symbol, a possible value range of the symbol is estimated for each layer. By contrast, this embodiment is different from the second embodiment in that, in the third embodiment, the expectation is acquired by selecting a specified number of symbols in the ascending order of the distance to the optimal estimated symbol, among those located around the optimal estimated symbol (hard-decision symbol), without estimating the range.

Specifically, after the "2-2) Perform Synchronous Detection" described in the second embodiment, the second calculating unit 24 estimates the optimal symbol for each of the layers by calculating Equation (13), instead of "2-3) Acquire Symbol Estimation Range". The second calculating unit 24 then selects the specified number of symbols from the symbols located around the estimated optimal symbol, in the ascending order of the Euclidean distance to the optimal symbol. The second calculating unit 24 then executes "2-4) Perform symbol expectation operation" using the selected predetermined number of symbols, and calculates the expectation.

[d] Fourth Embodiment

A fourth embodiment will now be explained. In the second embodiment, to allow SQRD-MMSE-SSIC in the lattice-reduced basis to generate an expectation of a symbol, a range of possible values is estimated for the symbol of each layer, and the expectations of all of the symbols falling within the estimated range is calculated. This embodiment is different from the second embodiment in that, in the fourth embodiment, the expectation is acquired by selecting a specified number of symbols among those positioned near the optimal estimated symbol (hard-decision symbol) and falling within the estimated range, in the ascending order of the distance to the optimal estimated symbol.

Specifically, the second calculating unit 24 estimates the optimal symbol for each layer by calculating Equation (13) after the process of "2-3) Acquire Symbol Estimation Range" explained in the second embodiment. The second calculating unit 24 then selects a specified number of symbols, in the ascending order of the Euclidean distance to the optimal symbol, among the symbols positioned around the optimal symbol and falling within the estimated symbol range. The second calculating unit 24 then executes "2-4) Perform symbol expectation operation" using the selected predetermined number of symbols, and calculates the expectation.

[e] Fifth Embodiment

A fifth embodiment will now be explained. In the first embodiment, MMSE-HPIC is used as the interference cancellation method executed after the inverse transformation from the lattice-reduced basis into the original basis. By contrast, in the fifth embodiment, as the interference cancellation method executed after the inverse transformation from the lattice-reduced basis into the original basis, MMSE-HPIC is executed once to begin with, and MMSE-SPIC is subsequently executed once or more.

Operation of Demodulator Apparatus 20

Figure 10:
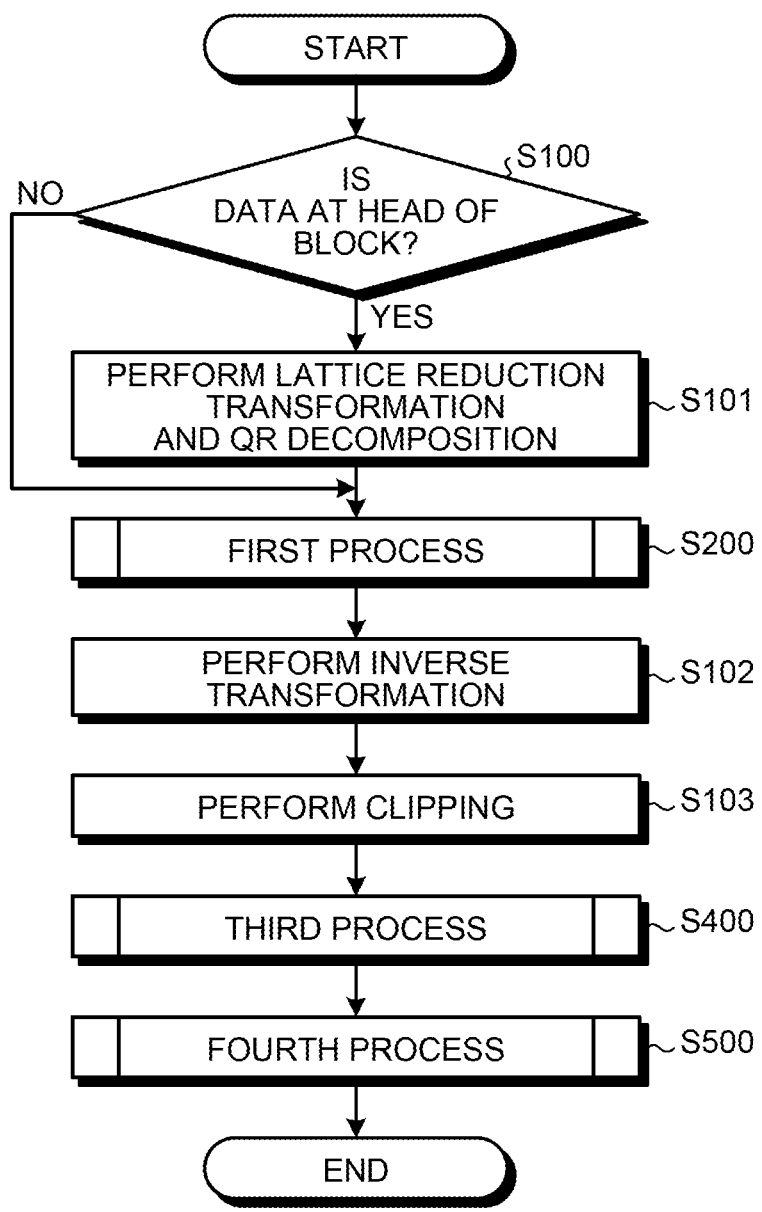
FIG. 10 is a flowchart illustrating an exemplary demodulation process according to a fifth embodiment.

FIG. 10 is a flowchart illustrating an exemplary demodulation process according to the fifth embodiment. Because the processes assigned with the same reference numerals in FIG. 10 as those in FIG. 4 are the same as those explained in FIG. 4, except for the point described below, redundant explanation thereof are omitted herein.

After the second transforming unit 23 performs clipping, the second calculating unit 24 generates soft-decision data by executing a third process which is described later (S400). The third process includes "4) Apply MMSE-HPIC Component Demodulation Process" explained in the first embodiment.

The second calculating unit 24 then generates soft-decision data based on the soft-decision data generated in the third process, by performing a fourth process described below (S500). The fourth process includes the process of "4) Perform Component Demodulation Process in MMSE-SPIC" explained in the second embodiment. The demodulator apparatus 20 then ends the process illustrated in the flowchart.

Third Process

Figure 11:
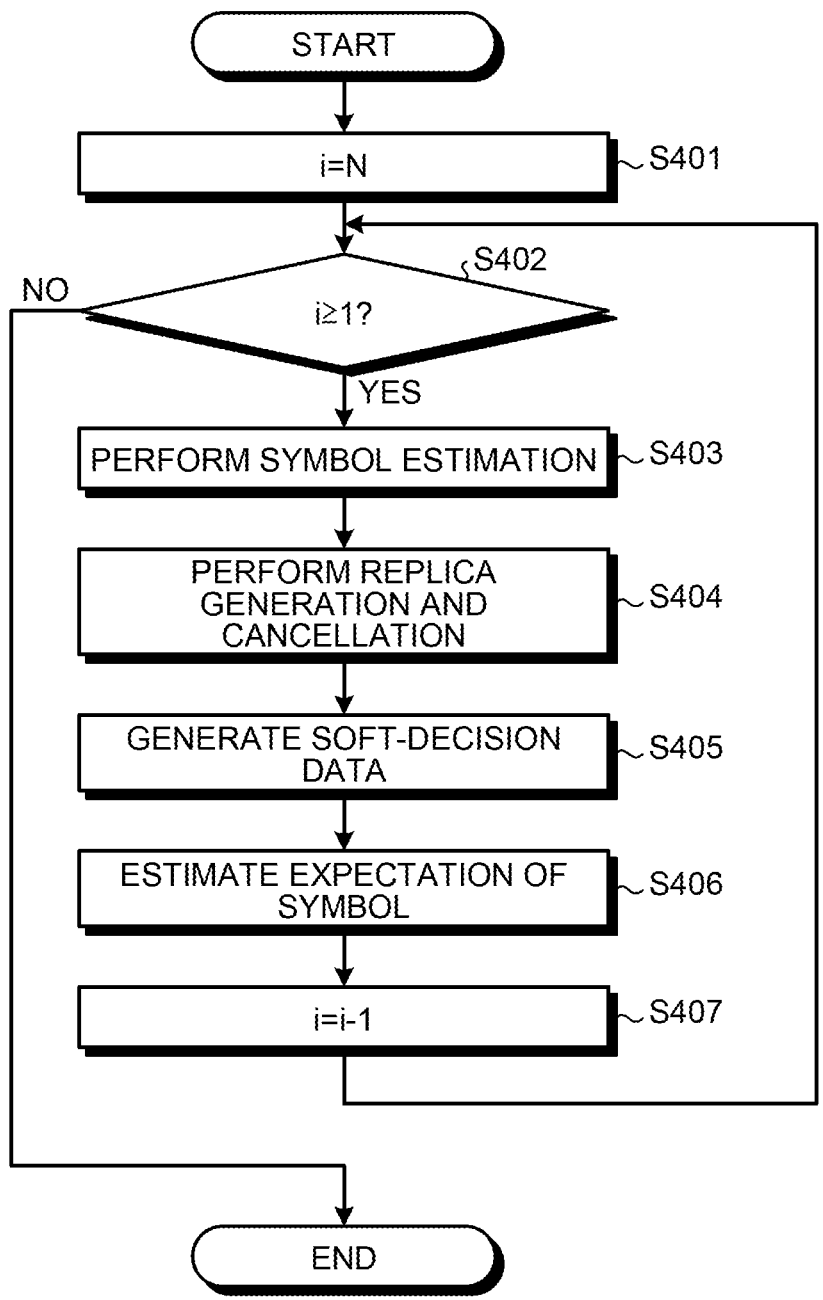
FIG. 11 is a flowchart illustrating an exemplary third process according to the fifth embodiment.

FIG. 11 is a flowchart illustrating an example of the third process in the fifth embodiment.

To begin with, the second calculating unit 24 sets the variable i to N that is the number of transmission antennas (the number of layers) (S401). The second calculating unit 24 then determines whether the value of the variable i is equal to or more than one (S402). If the value of the variable i is equal to or more than one (Yes at S402), the second calculating unit 24 performs the symbol estimation (S403). Specifically, the second calculating unit 24 estimates the hard-decision symbol calculated by the first calculating unit 22 as the estimated symbol. The second calculating unit 24 then performs replica generation and cancellation based on Equation (14), using the estimated symbol estimated at Step S403 (S404).

The second calculating unit 24 then generates soft-decision data by performing MMSE described above in the 1×M antenna configuration, using the reception signal vectors having the interference component cancelled (S405). The second calculating unit 24 then maps the generated soft-decision data to the prior probability, and estimates an expectation of the symbol (S406). The second calculating unit 24 then decrements the value of the variable i by one (S407), and performs the process at Step S402 again.

If the value of the variable i becomes less than one (No at S402), the second calculating unit 24 ends the process illustrated in the flowchart.

Fourth Process

Figure 12:
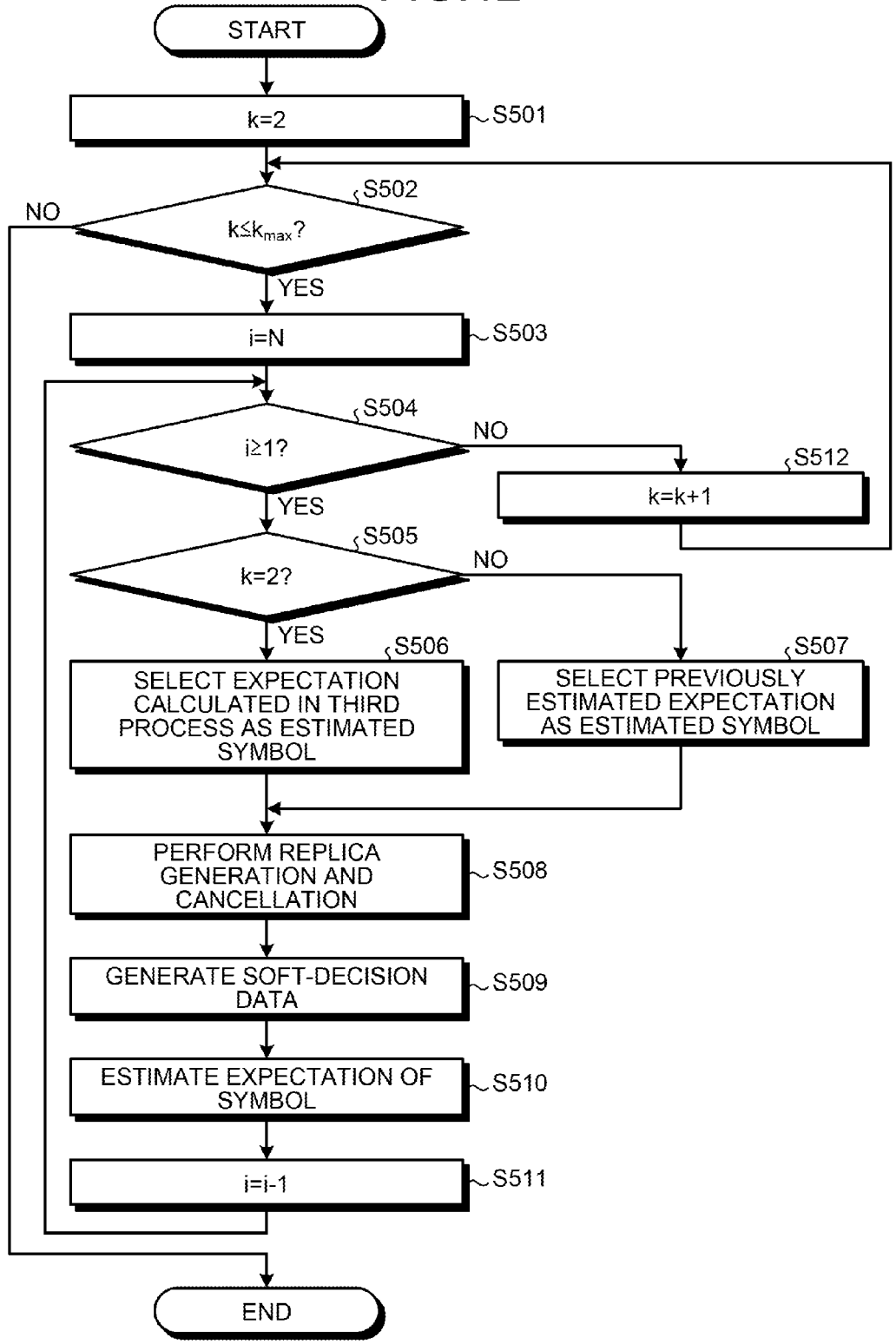
FIG. 12 is a flowchart illustrating an exemplary fourth process according to the fifth embodiment.

FIG. 12 is a flowchart illustrating an example of the fourth process according to the fifth embodiment.

To begin with, the second calculating unit 24 sets two to the variable k (S501). The second calculating unit 24 then determines whether the value of the variable k is equal to or less than $k_{max}$ (S502). If the value of the variable k is equal to or less than $k_{max}$ (Yes at S502), the second calculating unit 24 sets N that is the number of transmission antennas (the number of layers) to the variable i (S503). The second calculating unit 24 then determines whether the value of the variable i is equal to or more than one (S504). If the value of the variable i is equal to or more than one (Yes at S504), the second calculating unit 24 determines whether the value of the variable k is two (S505).

If the value of the variable k is two (Yes at S505), the second calculating unit 24 selects the expectation estimated in the third process explained using FIG. 11, as the estimated symbol (S506). If the value of the variable k is not two (No at S505), the second calculating unit 24 selects the expectation calculated in the previous estimation of the symbol expectation (the process at Step S510 described later) in the fourth process, as the estimated symbol (S507).

The second calculating unit 24 then performs replica generation and cancellation using the estimated symbol selected at Step S506 or S507, based on Equation (14) above (S508). The second calculating unit 24 then generates soft-decision data by performing MMSE described above in the 1×M antenna configuration, using the reception signal vectors having the interference component cancelled (S509). The second calculating unit 24 then maps the generated soft-decision data to the prior probability, and estimates the symbol expectation (S510). The second calculating unit 24 then decrements the value of the variable i by one (S511), and performs the process at Step S504 again.

If the value of the variable i becomes less than one (No at S504), the second calculating unit 24 adds one to the variable k (S512), and performs the process at Step S502 again. If the value of the variable k exceeds $k_{max}$ (No at S502), the second calculating unit 24 outputs the soft-decision data corresponding to each of the estimated symbols to the decoder 121, and ends the process illustrated in the flowchart.

Others

In the first embodiment, the second calculating unit 24 executes MMSE-HPIC in the original basis as the interference cancellation method, but the technologies according to the application are not limited thereto. For example, the second calculating unit 24 according to the first embodiment may execute MMSE-SPIC in the original basis as the interference cancellation method. Furthermore, in the embodiments described above, the second calculating unit 24 executes PIC as the interference cancellation method in the original basis, but the technologies according to the application are not limited thereto. For example, the second calculating unit 24 according to the embodiments may execute the SIC, SSIC in particular, as the interference cancellation method in the original basis.

Hardware

The elements included in each of the units described above and illustrated in the drawings are not always configured physically in the manner illustrated in the drawings. In other words, specific configurations in which the apparatuses are distributed or integrated are not limited to those illustrated in the drawings, and the whole or a part of the units may be distributed or integrated functionally or physically in any units depending on various loads or utilization.

Furthermore, the whole or a part of the processing functions implemented by each of the apparatuses may be executed by a micro-computer such as a central processing unit (CPU), a micro processing unit (MPU), and a micro controller unit (MCU). Furthermore, the whole or a part of the processing functions may be executed by a computer program parsed and executed by a CPU (or a micro-computer such as an MPU or an MCU), or implemented as hardware using wired logics.

Figure 13:
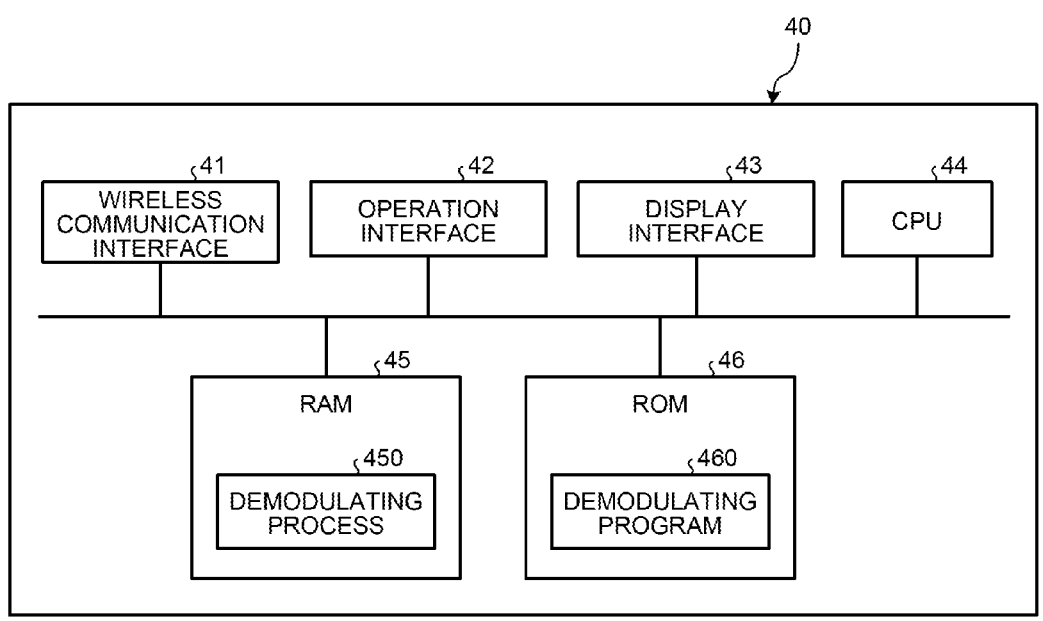
FIG. 13 is a schematic of an exemplary communication apparatus implementing the functions of the demodulator apparatus.

Various processes explained in the embodiments may be implemented by causing a communication apparatus to execute a computer program prepared in advance. Therefore, an exemplary communication apparatus having the same functions as those described in the embodiments will now be explained. FIG. 13 is a schematic of an exemplary communication apparatus implementing the functions of the demodulator apparatus.

In FIG. 13, a communication apparatus 40 executing a demodulating program includes a wireless communication interface 41, an operation interface 42, a display interface 43, a CPU 44, a random access memory (RAM) 45, and a read-only memory (ROM) 46.

As illustrated in FIG. 13, demodulating program 460 is stored in ROM 46, for example, in advance. The CPU 44 reads the demodulating program 460 from the ROM 46, and loads the demodulating program 460 onto the RAM 45. The demodulating program 460 may be integrated or distributed, in the same manner as in the other elements illustrated in FIG. 3. Furthermore, pieces of data stored in the ROM 46 do not always need to be stored in the ROM 46, and only the data used in the processing may be stored in the ROM 46.

The CPU 44 causes the demodulating program 460 to function as a demodulating process 450. The demodulating process 450 loads various data read from the ROM 46 onto the area of the RAM 45 assigned to the demodulating process 450 as appropriate, and performs various processing based on the loaded various types of data. In the embodiments described above, by causing the CPU 44 to read and to execute the demodulating program 460, the demodulating program 460 implements the same functions as those achieved by the first transforming unit 21, the first calculating unit 22, the second transforming unit 23, and the second calculating unit 24.

The demodulating process 450 according to the first, the third, and the fourth embodiments performs the process executed by the first transforming unit 21, the first calculating unit 22, the second transforming unit 23, and the second calculating unit 24 illustrated in FIG. 3, e.g., the processes illustrated in FIGS. 4 to 6. The demodulating process 450 according to the second embodiment performs the processes executed by the first transforming unit 21, the first calculating unit 22, the second transforming unit 23, and the second calculating unit 24 illustrated in FIG. 3, e.g., the processes illustrated in FIGS. 7 and 8. The demodulating process 450 according to the fifth embodiment performs the processes executed by the first transforming unit 21, the first calculating unit 22, the second transforming unit 23, and the second calculating unit 24 illustrated in FIG. 3, e.g., the processes illustrated in FIGS. 9 to 11. All of the processing units implemented virtually by the CPU 44 do not always need to be implemented by the CPU 44, and only the processing unit used in the process may be implemented.

Furthermore, the demodulating program 460 does not need to be stored in the ROM 46 from the beginning. For example, the computer programs may be stored in a portable recording medium such as a memory card inserted into the communication apparatus 40, and the communication apparatus 40 may acquire the computer programs from the portable recording medium and execute the computer programs. Furthermore, the communication apparatus 40 may also acquire the computer programs from another device such as a computer and a server device storing therein the computer programs, over a wireless communication circuit, a public circuit, the Internet, a local area network (LAN), or a wide area network (WAN).

In the embodiments described above, the first transforming unit 21 QR-decomposes the channel response matrix H into the product of an orthogonal matrix Q and an upper triangular matrix R, and calculates the lattice reduction transformation matrix T and its inverse matrix $T^{-1}$ for the channel response matrix, and applies lattice reduction to the orthogonal matrix Q and the upper triangular matrix R. The first calculating unit 22 then uses the lattice-reduced orthogonal matrix Q in performing the linear detection of the reception signal in the lattice-reduced basis, and calculates an expectation of the symbol in the lattice-reduced basis. However, the technologies according to the application are not limited thereto.

For example, the first transforming unit 21 need not QR-decompose the channel response matrix H. In such a case, the first transforming unit 21 applies lattice reduction to the channel response matrix H, and the first calculating unit 22 performs linear detection of the reception signal in the lattice-reduced basis using the lattice-reduced channel matrix, and calculating an expectation of the symbol in the lattice-reduced basis.

According to one embodiment, a lower computational load, being lower than computational load in QRM-MLD using lattice reduction, can be achieved, and reception performance, equivalent to reception performance achieved by QRM-MLD using lattice reduction, can also be achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A demodulator apparatus comprising:
a plurality of antennas;
a memory; and
a processor coupled to the plurality of antennas and the memory, wherein
the processor executes a process comprising:
receiving signal via each of the plurality of antennas;
applying lattice reduction to a channel response matrix calculated by using the received signal;
applying linear detection to the received signal in lattice-reduced basis using a lattice-reduced channel response matrix;
first calculating an expectation of a symbol in the lattice-reduced basis;
inversely transforming the expectation of the symbol from the lattice-reduced basis into an original basis;
second calculating soft-decision data by performing interference cancellation method in inversely transformed expectation of the symbol in the original basis; and
outputting bits obtained by performing an error correcting decoding process using the soft-decision data.

2. The demodulator apparatus according to claim 1, wherein the first calculating includes calculating a hard-decision symbol that is a result of applying a quantizing function to an estimated symbol acquired from synchronous detection in the lattice-reduced basis, as the expectation of the symbol.

3. The demodulator apparatus according to claim 1, wherein the first calculating includes calculating a soft-decision symbol that is an expectation using a probability distribution as a weight in the lattice-reduced basis, as the expectation of the symbol.

4. The demodulator apparatus according to claim 3, wherein the first calculating includes calculating a hard-decision symbol that is a result of applying a quantizing function to an estimated symbol acquired from synchronous detection in the lattice-reduced basis, identifying, for each layer, a range of possible values for the symbol in the lattice-reduced basis, and calculating the expectation of the symbol using a Gaussian distribution of symbols falling within the identified range, as the probability distribution.

5. The demodulator apparatus according to claim 3, wherein the first calculating includes calculating a hard-decision symbol that is a result of applying a quantizing function to an estimated symbol acquired from synchronous detection in the lattice-reduced basis, selecting, for each layer, a predetermined number of symbols in the ascending order of Euclidean distance to the hard-decision symbol in the lattice-reduced basis, and calculating the expectation of the symbol using a Gaussian distribution of the selected symbols as the probability distribution.

6. The demodulator apparatus according to claim 3, wherein the first calculating includes calculating a hard-decision symbol that is a result of applying a quantizing function to an estimated symbol acquired from synchronous detection in the lattice-reduced basis, identifying, for each layer, a range of possible values for the symbol in the lattice-reduced basis, selecting a predetermined number of symbols in the lattice in the lattice-reduced basis within the identified range in the ascending order of Euclidean distance to the hard-decision symbol, and calculating the expectation of the symbol using a Gaussian distribution of the selected symbols as the probability distribution.

7. The demodulator apparatus according to claim 1, wherein the second calculating includes performing soft parallel interference cancellation (SPIC) as the interference cancellation method.

8. The demodulator apparatus according to claim 1, wherein the second calculating includes performing soft successive interference cancellation (SSIC) as the interference cancellation method.

9. The demodulator apparatus according to claim 1, wherein the second calculating includes calculating the soft-decision data by performing the interference cancellation method a plurality of number of times in the original basis, the interference cancellation method performed for a first time is interference cancellation method using a hard-decision symbol calculated by the linear detection; and the interference cancellation method performed for a second time and thereafter is interference cancellation method using a soft-decision symbol.

10. A demodulation method executed by a wireless communication apparatus, the demodulation method comprising:

receiving signal via each of a plurality of antennas, using a processor of the wireless communication apparatus;

lattice-reducing a channel response matrix calculated by using the received signal, using the processor of the wireless communication apparatus;

applying linear detection to the received signal in lattice-reduced basis using a lattice-reduced channel response matrix, using the processor of the wireless communication apparatus;

calculating an expectation of a symbol in the lattice-reduced basis, using the processor of the wireless communication apparatus;

inversely transforming the expectation of the symbol from the lattice-reduced basis into the original basis, using the processor of the wireless communication apparatus;

calculating soft-decision data by performing interference cancellation method in inversely transformed expectation of the symbol in the original basis, using the processor of the wireless communication apparatus; and outputting bits obtained by performing an error correcting decoding process using the soft-decision data, using the processor of the wireless communication apparatus.

* * * * *